United States Patent [19]

Bealkowski et al.

[11] Patent Number: 5,355,489

[45] Date of Patent: Oct. 11, 1994

[54] BIOS LOAD FOR A PERSONAL COMPUTER SYSTEM HAVING A REMOVABLE PROCESSOR CARD

[75] Inventors: Richard Bealkowski, Delray Beach; John W. Blackledge, Jr., Boca Raton; Doyle S. Cronk, Boca Raton; Richard A. Dayan, Boca Raton; Scott G. Kinnear, Boca Raton; George D. Kovach, Boca Raton; Jay H. Neer, Boca Raton, all of Fla.; Matthew S. Palka, Jr., Raleigh, N.C.; Robert Sachsenmaier, Boca Raton, Fla.; Kevin M. Zyvoloski, Raleigh, N.C.

[73] Assignee: International Business Machines Corp., Armonk, N.Y.

[21] Appl. No.: 675,587

[22] Filed: Mar. 26, 1991

Related U.S. Application Data

[63] Continuation-in-part of Ser. No. 398,865, Aug. 25, 1989, Pat. No. 5,210,875, which is a continuation-in-part of Ser. No. 425,669, Oct. 23, 1989, Pat. No. 5,162,979.

[51] Int. Cl.$^5$ .............................................. G06F 9/06
[52] U.S. Cl. ...................... 395/700; 364/DIG. 1; 364/254.6; 364/280.2; 364/280.9; 364/254.2; 364/251.5; 340/825.31; 340/825.34; 395/500; 395/425; 395/325
[58] Field of Search ............... 395/200, 700, 425, 500, 395/325

[56] References Cited

U.S. PATENT DOCUMENTS

| | | | |
|---|---|---|---|
| 4,030,073 | 6/1977 | Armstrong, Jr. | 340/172.5 |
| 4,654,783 | 3/1987 | Veres et al. | 364/200 |
| 4,663,707 | 5/1987 | Dawson | 395/700 |
| 5,014,193 | 5/1991 | Garner et al. | 364/200 |
| 5,136,713 | 8/1992 | Bealkowski et al. | 395/700 |

Primary Examiner—Thomas C. Lee
Assistant Examiner—Peter Y. Wang
Attorney, Agent, or Firm—Bruce D. Jobse; Joseph P. Abate

[57] ABSTRACT

An apparatus for loading BIOS stored on a direct access storage device in a personal computer system, the system comprising direct access storage device, and a processor card removably mounted to a planar board. The processor card comprises a system processor and ROM memory, while the planar board includes a main memory. A master boot record is stored on the direct access storage device. The master boot record contains a data segment and an executable code segment, the data segment representing the hardware configuration of the personal computer system. A first portion of BIOS included in the ROM memory initializes the system and causes loading of the master boot record into main memory. This first portion of BIOS further compares the hardware configuration data of the master boot record with the hardware configuration data in the ROM memory to verify compatibility with the system processor. Once compatibility of the master boot record with the system processor is verified, the first portion of BIOS transfers control to an executable code segment of the master boot record to effect loading of the remaining portion of BIOS into main memory, and the first portion of BIOS is discarded.

20 Claims, 20 Drawing Sheets

ROM-BIOS

BIOS LOAD FOR A PERSONAL COMPUTER SYSTEM HAVING A REMOVABLE PROCESSOR CARD

This application is a continuation-in-part of copending application Ser. No. 07/398,865, filed Aug. 25, 1989, now U.S. Pat. No. 5,210,875, and further is a continuation-in-part of copending application Ser. No. 07/425,669, filed Oct. 23, 1989, now U.S. Pat. No. 5,162,979 all commonly owned.

CROSS REFERENCE TO RELATED PATENT APPLICATIONS

The present patent application is one of a group of commonly owned copending applications which concern the same overall computer system. Three of these related patent applications (1–3) were filed on the same date, namely Aug. 25, 1989, a fourth (4) was filed on Oct. 23, 1989, and a fifth (5) was filed on Jul. 23, 1990. These five applications (1–5) are specifically incorporated by reference herein, and are described more particularly as follows:

(1) Application Ser. No. 07/399,631, entitled "An Apparatus and Method for Loading BIOS from a Diskette in a Personal Computer System", the inventors being Bealkowski et al., now abandoned;

(2) Application Ser. No. 07/398,860, entitled "An Apparatus and Method for Decreasing the Memory Requirements for BIOS in a Personal Computer System", the inventors being Bealkowski et al., now U.S. Pat. No. 5,136,713;

(3) Application Ser. No. 07/398,820, entitled "An Apparatus and Method for Preventing Unauthorized Access to BIOS in a Personal Computer System", the inventors being Bealkowski et al., now U.S. Pat. No. 5,022,077;

(4) Application Ser. No. 07/425,669 entitled "Personal Computer Processor Card Interconnect System", the inventors being Anzelone et al., now U.S. Pat. No. 5,162,979; and (5) Application Ser. No. 07/557,334, entitled "An Apparatus and Method for Loading a System Reference Partition in a Personal Computer System", the inventors being Arnold et al., now U.S. Pat. No. 5,128,995.

FIELD OF THE INVENTION

This invention relates to personal computer systems and, in particular, to apparatus and methods for installing BIOS into personal computer systems.

BACKGROUND DISCUSSION

Personal computer systems in general and IBM personal computers in particular have attained widespread use for providing computer power to many segments of today's modern society. A personal computer system can usually be defined as a desk top, floor standing, or portable microcomputer that consists of a system unit having a single system processor, a display monitor, a keyboard, one or more diskette drives, a fixed disk storage, and an optional printer. One of the usual characteristics of these systems has been the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70, 80, 90 and 95.

These systems can be classified into two general families. The first family, usually referred to as Family I Models, uses a bus architecture exemplified by the IBM PERSONAL COMPUTER AT and other "IBM compatible" machines. The second family, referred to as Family II Models, uses IBM's MICRO CHANNEL bus architecture exemplified by IBM's PERSONAL SYSTEM/2 Models 50 through 95.

Beginning with the earliest personal computer system of the Family I models, such as the IBM Personal Computer, it was recognized that software compatibility would be of utmost importance. In order to achieve this goal, an insulation layer of system resident code, also referred to as "microcode," was established between the hardware and software. This code provided an operational interface between a user's application program/operating system and the device to relieve the user of the concern about the characteristics of hardware devices. Eventually, the code developed into a BASIC input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Because BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Because the technology is rapidly changing and new I/O devices are being added to the personal computer systems, modification to the BIOS has become a significant problem in the development cycle of the personal computer system.

For instance, with the introduction of the IBM PERSONAL SYSTEM/2 computer system with MICRO CHANNEL architecture, a significantly new BIOS, known as Advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT system, only 32K bytes of ROM were resident on the planar board. Fortunately, the system could be expanded to 96K bytes of ROM. Unfortunately, because of system constraints, this turned out to be the maximum capacity available for BIOS. Luckily, even with the addition of ABIOS, ABIOS and CBIOS could still squeeze into 96K of ROM. However, only a small percentage of the 96K ROM area remained available for expansion. With the addition of future I/O devices, CBIOS and ABIOS will eventually run out of ROM space. Thus, new I/O technology will not be able to be integrated easily within CBIOS and ABIOS.

As a result of these problems, and of the desire to make modification in Family II BIOS as late as possible in the development cycle, it has become necessary to off load portions of BIOS from the ROM. Because marketability and consumer acceptance of personal computer systems appear to require the ability to add new I/O devices and to minimize cost, it should be appreciated that easy modification of Family II models' BIOS is a substantial factor in achieving success in accordance with this invention. Thus, there exists a need for a method and apparatus which permits portions of BIOS to be stored on a direct access storage device such as a fixed disk or on the diskette drive. These portions can then be easily modified and loaded into the personal computer system when required.

Finally, it is difficult to replace the system processor, ROM and associated components with changed (e.g., upgraded) components when all of these components are fixed on a single motherboard or planar board. Processor cards have been suggested in which a microprocessor and related components are mounted on a printed circuit board (PCB) that can be plugged into a mating connector on a planar board. However, it has become desirable to develop other designs in view of thirty-two bit wide data and address paths employed in some personal computer systems.

SUMMARY OF THE INVENTION

The present invention has been developed for the purpose of alleviating the above-mentioned problems. Accordingly, the invention has as one of its objects an apparatus and method for increasing the number of devices BIOS supports by storing a portion of BIOS on a direct access storage device.

Another objective of the present invention is to provide an apparatus and method for loading BIOS from a direct access storage device into main memory.

Yet another objective of the present invention is to provide an apparatus and method which confirms the compatibility between BIOS and the personal computer system.

Another objective of the present invention is the ability to verify the system configuration before loading BIOS from the direct access storage device.

A further objective of the present invention is the ability to readily replace the system processor and at least a portion of BIOS.

Broadly considered, a personal computer system according to the present invention comprises: a processor card including a system processor and a read only memory; a planar board including a random access main memory; and at least one direct access storage device. The processor card is mounted on the planar board so as to allow a user to readily replace the processor card. The read only memory includes a first portion of BIOS. The first portion of BIOS initializes the system processor and the direct access storage device to read a master boot record from the direct access storage device into the random access memory.

The master boot record includes a data segment and an executable code segment. The data segment includes data representing system hardware and a system configuration which is supported by the master boot record.

The first BIOS portion confirms that the master boot record is compatible with the system hardware by verifying that the data from the data segment of the master boot record agrees with data included within the first BIOS portion representing the system processor, system planar, and planar I/O configuration.

If the master boot record is compatible with the system hardware, the first BIOS portion vectors the system processor to execute the executable code segment of the master boot record. The executable code segment confirms that the system configuration has not changed and loads in the remaining BIOS portion from the direct access storage device into the random access memory. The executable code segment then verifies the authenticity of the remaining BIOS portion and vectors the system processor to begin executing the BIOS now in random access memory. BIOS, executing in random access memory, then boots up the operating system to begin operation of the personal computer system. The first BIOS portion, being no longer addressable and superseded by the remaining BIOS portion, is abandoned.

BRIEF DESCRIPTION OF THE DRAWINGS

The foregoing aspects and other features of the present invention are explained in the following written description, taken in connection with the accompanying drawings, wherein.

DETAILED DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

Figure 1:
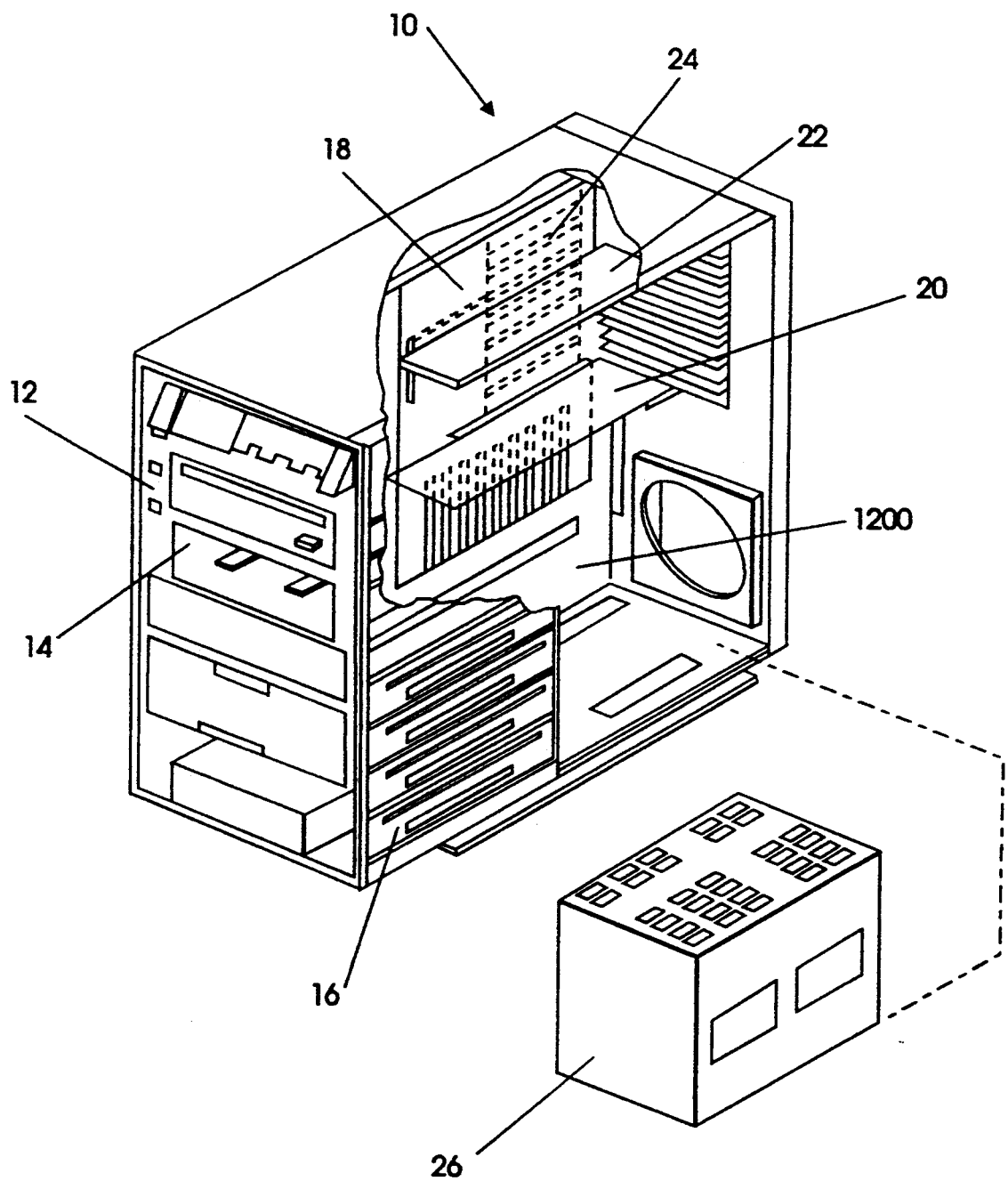
FIG. 1 illustrates a cut away view of a personal computer system according to the present invention.
Figure 2:
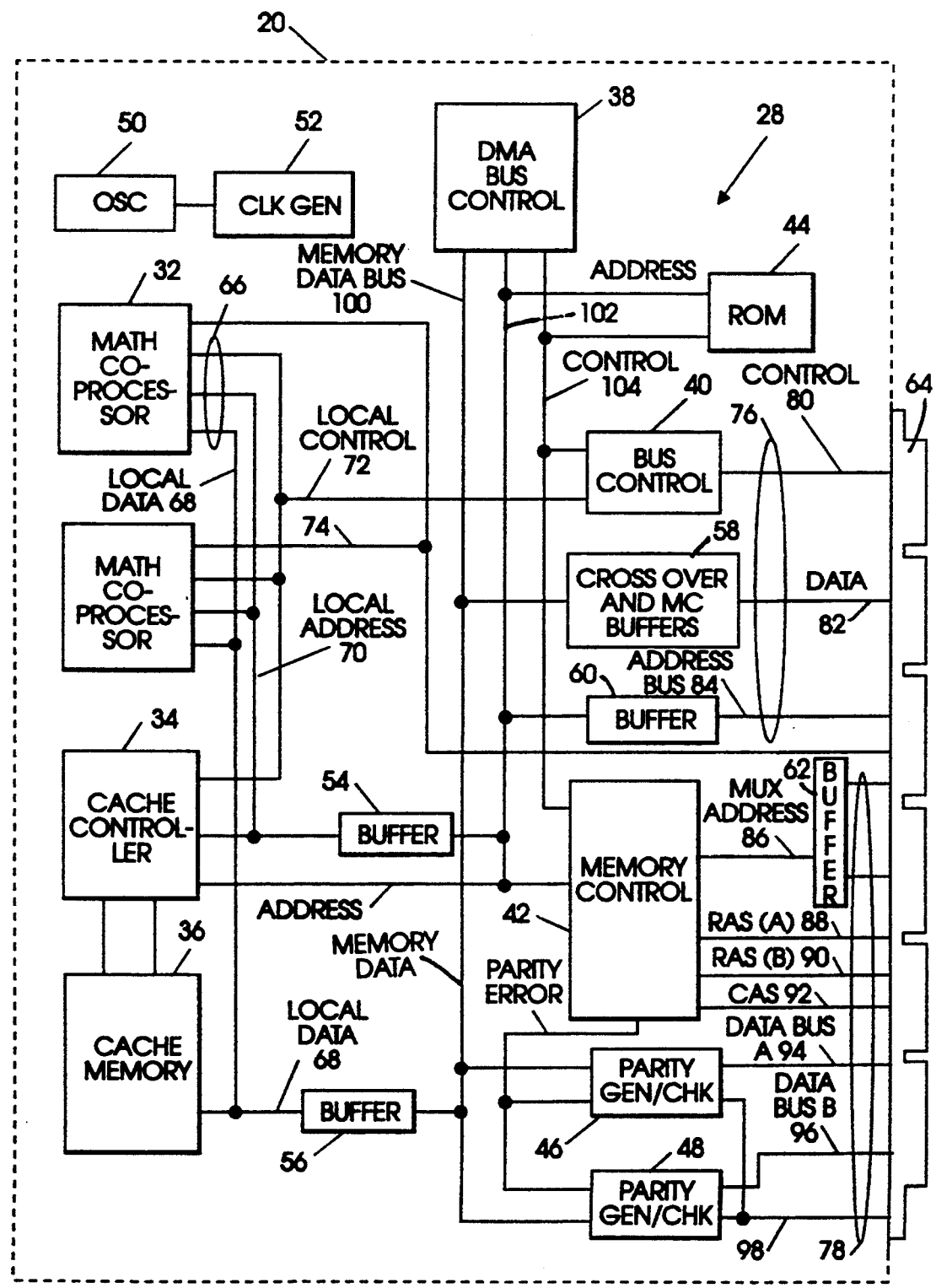
FIG. 2 is a block schematic diagram of a system processor card for the personal computer system of FIG. 1.

Referring now to the drawings and, in particular, to FIG. 1, there is shown a cutaway view of a personal computer system 10 having a plurality of DASD (Direct Access Storage Devices) 12–16 electrically connected to a system or planar board 18 which is mounted on a frame 1200. Each of the DASD is electrically connected to the board 18 through either an adaptor 22 (for example, SCSI adapter as shown in FIG. 3A) connected to appropriate I/O slots 24 or an appropriate one of a plurality connectors 126, 128, 130, 132, 134 shown in FIG. 3. The adapter 22 includes suitable controlling devices (not shown). A power supply 26 provides electrical power to the system 10 in a manner well known. Removably mounted on the planar board 18 is a system processor card 20 including a system processor (for example, a microprocessor 30 as shown in FIG. 2) which operates under the control of computer instructions to input, process, and output information. The system 10 can include, in addition, a display monitor, a keyboard and a printer (all not shown) suitably connected to the planar board 18 in a well known manner.

In use, the personal computer system 10 is designed primarily to give independent computing power to a small group of users or a single user and is inexpensively priced for purchase by individuals or small businesses. In operation, the system processor operates under an operating system, such as IBM's OS/2 Operating System or PC-DOS. This type of operating system includes or utilizes a BIOS interface between the DASD 12–16 and the Operating System. A portion of BIOS divided into modules by function is stored in a read only memory (ROM) 44 of the processor card 20 shown in FIG. 2 and hereinafter will be referred to as ROM-BIOS. BIOS provides an interface between the hardware and the operating system software to enable a programmer or user to program their machines without an indepth operating knowledge of a particular device. For example, a BIOS diskette module permits a programmer to program the diskette drive without an indepth knowledge of the diskette drive hardware. Thus, a number of diskette drives designed and manufactured by different companies can be used in the system. This not only lowers the cost of the system 10, but also permits a user to choose from a number of diskette drives.

Processor Card

Referring to FIG. 2, there is shown a block diagram of a preferred embodiment of the processor card 20 of the personal computer system 10. The processor card 20 comprises a printed circuit board (PCB) 28 having mounted (e.g., surface mounted) thereon a plurality of commercially available components including a system processor such as a microprocessor 30, a math coprocessor 32, a cache controller 34, a cache memory 36, a direct memory access (DMA) bus control unit 38, a bus controller 40, a memory controller 42, a read only memory (ROM) 44, parity checking units 46, 48, an oscillator 50 and a clock generator 52. Although any appropriate microprocessor 30 can be used, the microprocessor 30 preferably is a high performance type, such as an Intel 80386, Intel 80386DX or Intel 80486 microprocessor, having thirty-two bit data paths and providing thirty-two bit addressing capability. The remaining components are selected in conventional fashion for their compatibility with such microprocessor. A plurality of buffers 54, 56, 58, 60, 62 is connected as shown. The buffers provide selective isolation or connection between the circuits allowing different portions to be used concurrently, for example, to move data between the microprocessor and cache while other data is being transferred between an I/O unit and a main memory. All of the above components are electrically connected to each other as appropriate by printed wiring circuits in PCB 28 which terminate at contacts, described below, located along an edge 64. Such edge 64 is pluggable into edge connectors 108, 110 on the planar board 18 shown in FIG. 3 so that the board 18 and the card 20 are electrically and mechanically interconnectable.

The wiring circuits of PCB 28 include a local bus 66 including data, address and control lines 68, 70 and 72, respectively, which interconnect microprocessor 30 with coprocessor 32, cache controller 34 and cache memory 36, as shown in FIG. 2. The remaining circuit lines generally include interrupt lines 74, channel bus lines 76 and memory bus lines 78. The channel bus lines 76 include control, data and address bus lines 80, 82 and 84, respectively. Memory bus lines 78 include multiplexed memory address lines 86, row address strobe (RAS) lines 88, 90 for memory banks A, B, column address strobe (CAS) line 92, data bus A and B lines 94 and 96, and a line 98 for use in error checking via parity check or ECC checking. Further circuit lines include those needed for direct memory access and include memory data lines 100, address lines 102, and control lines 104. For simplicity, certain miscellaneous lines, such as reset, grounds, power-on, etc. have been omitted from the drawings.

Planar Board

Figures 1, 3:
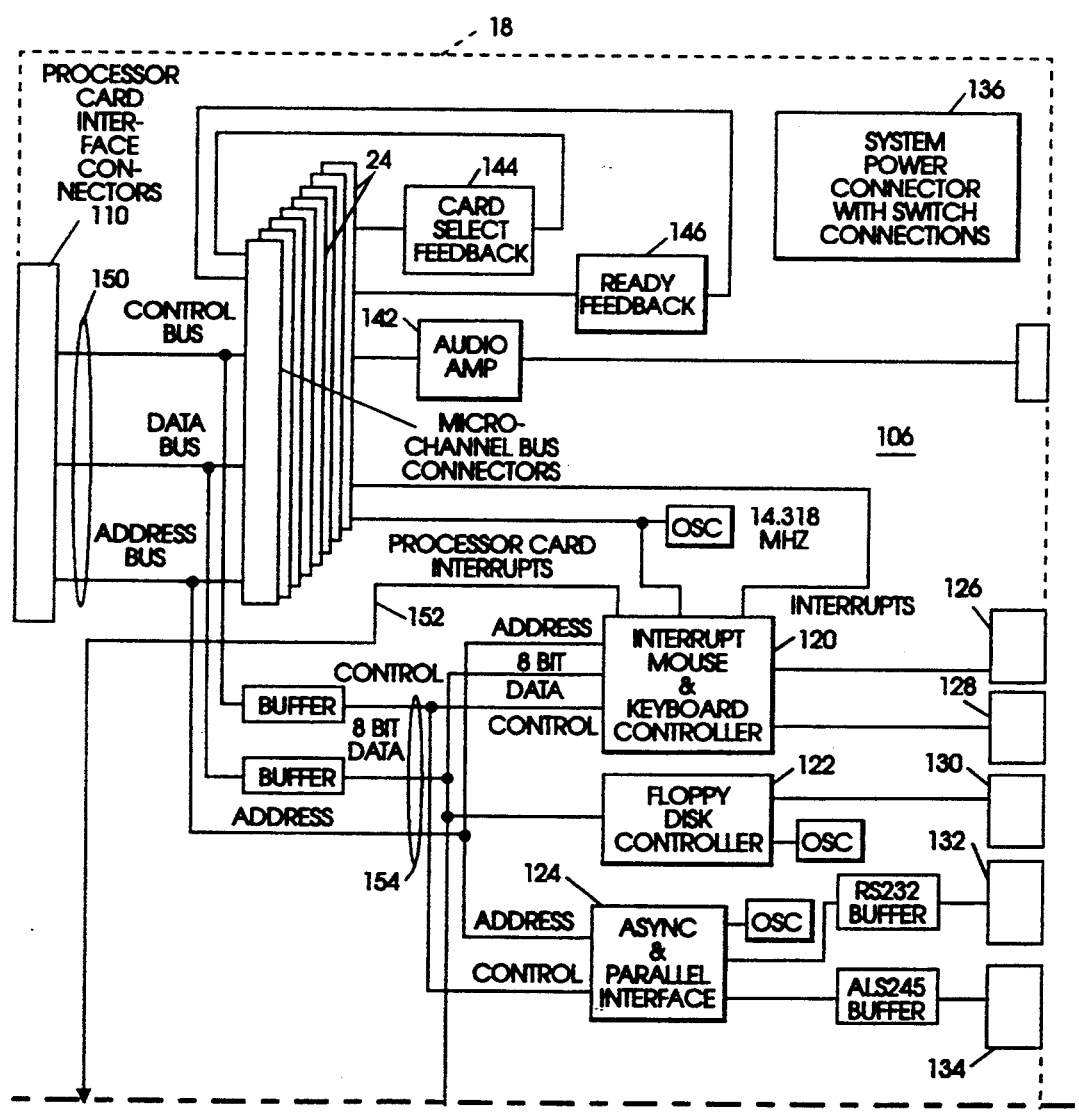
FIG. 3 is a block schematic diagram of a system planar board for the personal computer system of FIG. 1.
Figures 1, 2, 3:
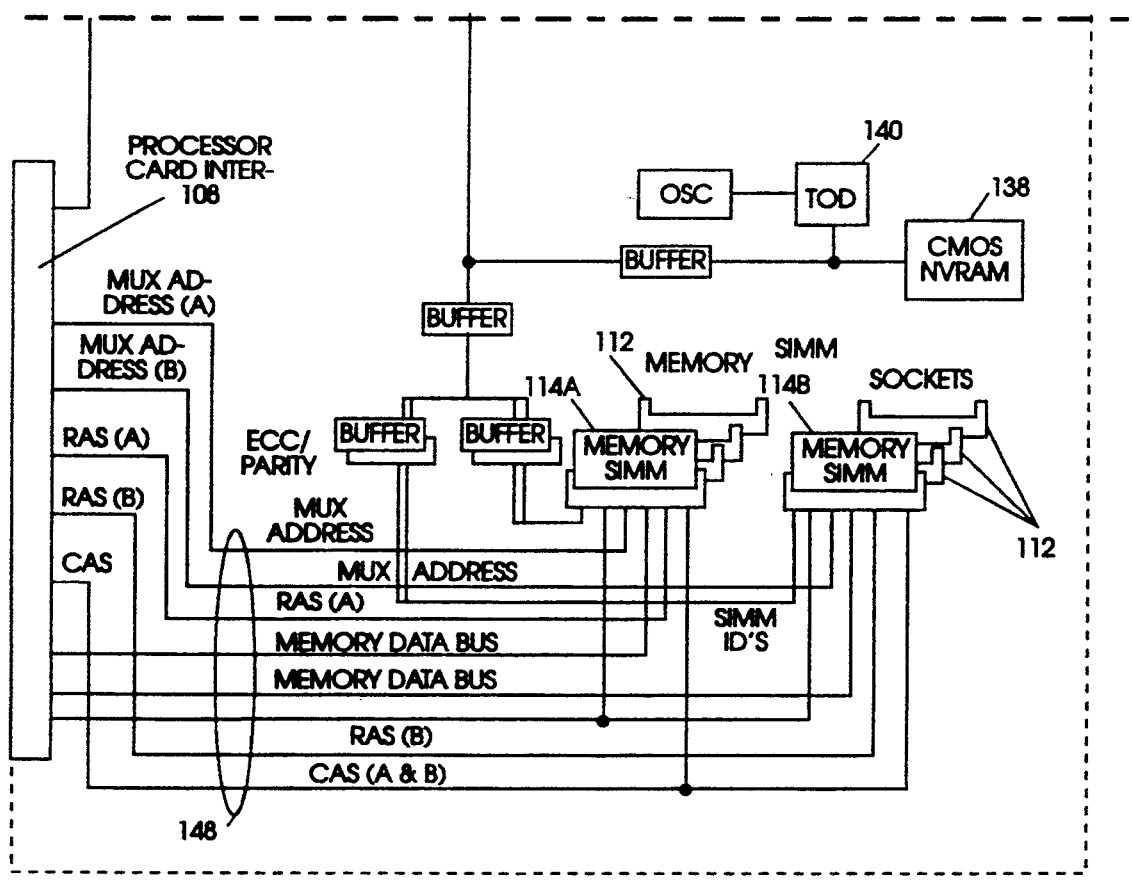
Figure 3A:
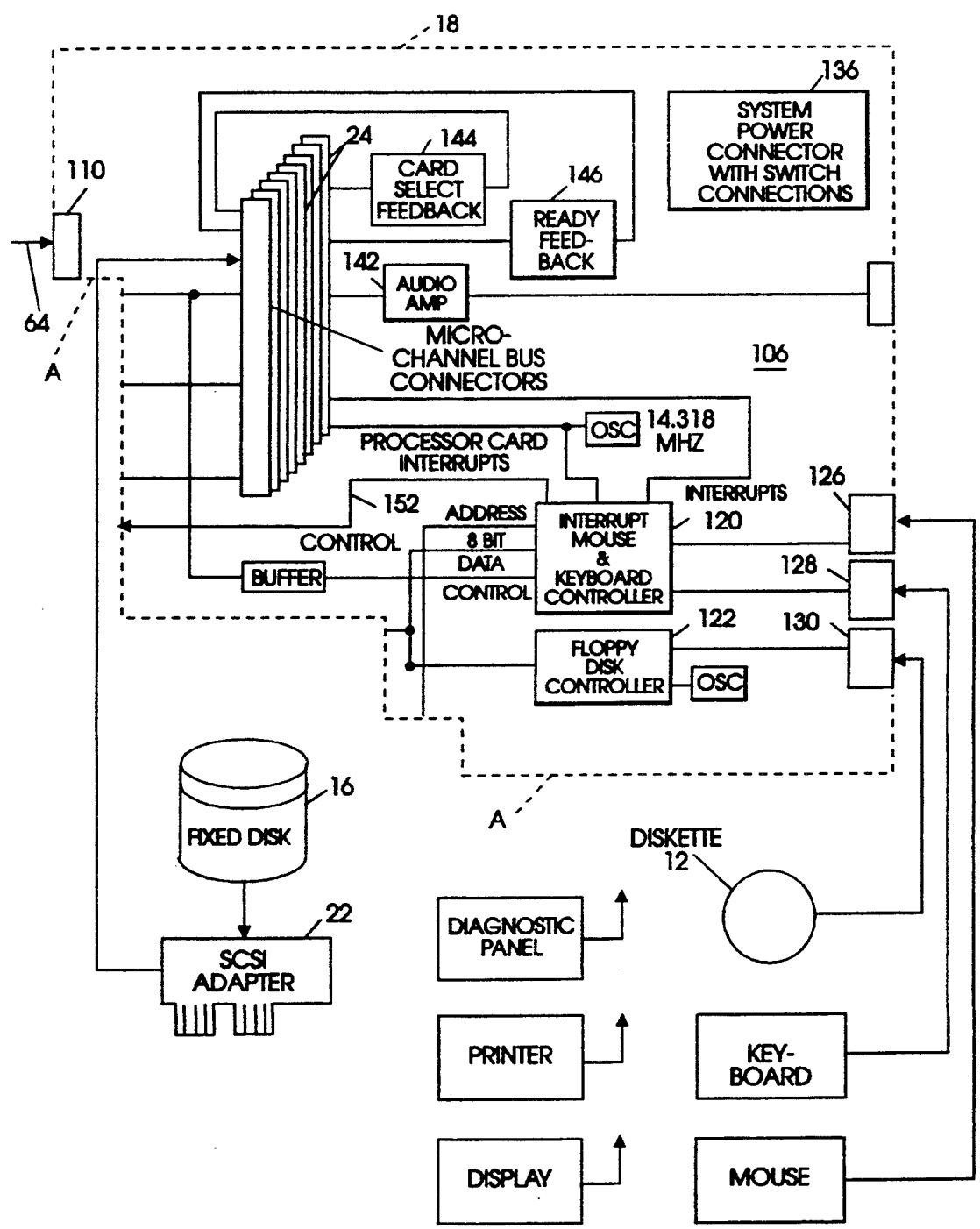
FIG. 3A is a diagram showing a fixed disk drive, a diskette drive and I/O devices connected to the planar board of FIG. 3.

Referring to FIG. 3, there is shown a preferred embodiment of the planar board 18 of the system 10. The board 18 comprises a printed circuit board (PCB) 106 upon which are mounted (e.g., surface mounted) various components that are interconnected by wiring or circuits in the PCB. Such components include two connectors 108, 110 (described in more detail below) into which the processor card 20 is plugged for removably mounting the processor card upon the planar board 18. A plurality of single in-line memory module (SIMM) connectors 112 is also mounted on PCB 106 for connecting to memory banks 114A, 114B each having SIMM's thereon forming the system main memory. One or more expansion connectors (I/O slots) 24 are also mounted on PCB 106 for connection to different expansion adapters and options that might be added or incorporated into the personal computer system 10. For example, hard file or fixed disk drive 16 is connected to a SCSI adaptor 22 which is connected to a connector 24 (FIG. 3A). FIG. 3A is a view of the board 18 broken away along a dotted and dashed line A and connected to various I/O devices. Preferably, each connector 24 is a commercially available connector of the type conforming to the above-mentioned MICRO CHANNEL architecture, and the connectors 108, 110 are identical thereto but differ in their use as to what signals or ground lines are connected to the various elements in each connector. Examples of such connectors 24, 108, 110 are connector model numbers CEE2X91S-7Z14, and CE2X82S-8Z14, manufactured by Burndy Corporation.

We refer again to FIG. 3. Also mounted on planar board 18 are an interrupt, mouse and keyboard controller 120, connected to mouse and keyboard connectors 126, 128, a floppy disk controller 122 connected to a diskette connector 130, and an asynchronous and parallel interface 124 connected to an asynchronous connector 132, and to parallel port connector 134, which allow the various I/O devices to be connected into the system. In addition to being interfaced with the fixed disk 16, the system processor 30 can be interfaced with the diskette controller 122 which controls a diskette drive 12. With respect to terminology, it is also to be understood that the term "hardfile" describes fixed disk drive 16 while the term "floppy" also describes diskette drive 12. A system power connector 136 is mounted on PCB 106 for connection to a plug in power unit 26 (FIG. 1) that supplies the necessary power for the system. A nonvolatile memory (NVRAM) 138 and a time-of-day clock 140 are also mounted on PCB 106. Also mounted on PCB 106 are an audio amplifier 142, a card select feedback 144 and a ready feedback 146. The PCB 106 also has mounted thereon various oscillators to provide timing signals, and buffers to isolate sections of the circuitry.

The wiring of PCB 106 interconnects the various components as shown in the drawing and is grouped into three groupings, a memory bus 148, a channel bus 150, and miscellaneous signal lines including interrupt lines 152, all of which are connected to counterpart wiring on PCB 28 through the connectors 108, 110. Tapped off the bus 150 is a planar function bus 154.

Figure 10:
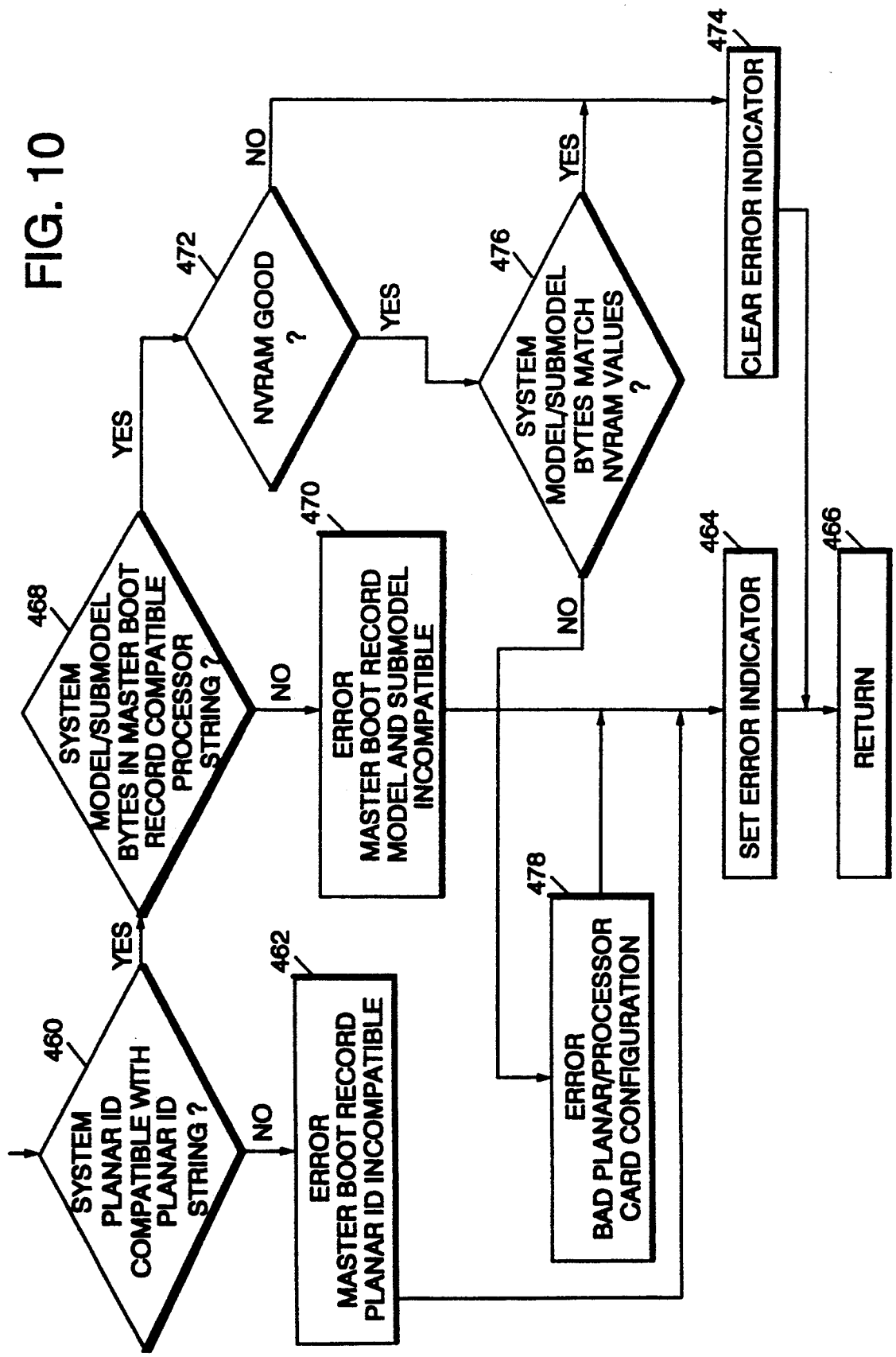
FIG. 10 is a flowchart showing, in greater detail, checking the compatibility between the master boot record and the planar/processor configuration.

Returning to the nonvolatile memory (NVRAM) 138, such nonvolatile memory can be CMOS with battery backup to retain information whenever power is removed from the system. Because the ROM 44 is normally resident on the processor card 20, model and submodel values stored in ROM are used to identify the system processor and the system planar I/O configuration, respectively. Thus, these values will physically identify the processor and the planar I/O configuration. The NVRAM 138 is used to store system configuration data. That is, the NVRAM will contain values which describe the present configuration of the system. For example, NVRAM contains information describing the capacity of a fixed disk or diskette, the type of display, the amount of memory, time, date, etc. Additionally, the model and submodel values stored in ROM are copied to NVRAM whenever a special configuration program, such as SET Configuration, is executed. The purpose of the SET Configuration program utility is to store values characterizing the configuration of the system in NVRAM. Thus, for a system that is configured properly, the model and submodel values in NVRAM will be equal, respectively, to the model and submodel values stored in ROM. If these values are not equal, this indicates that the configuration of the system has been modified. Reference is made to FIG. 10, where this feature in combination with loading BIOS is explained in greater detail.

Processor Card-Planar Board Mount

Figure 12:
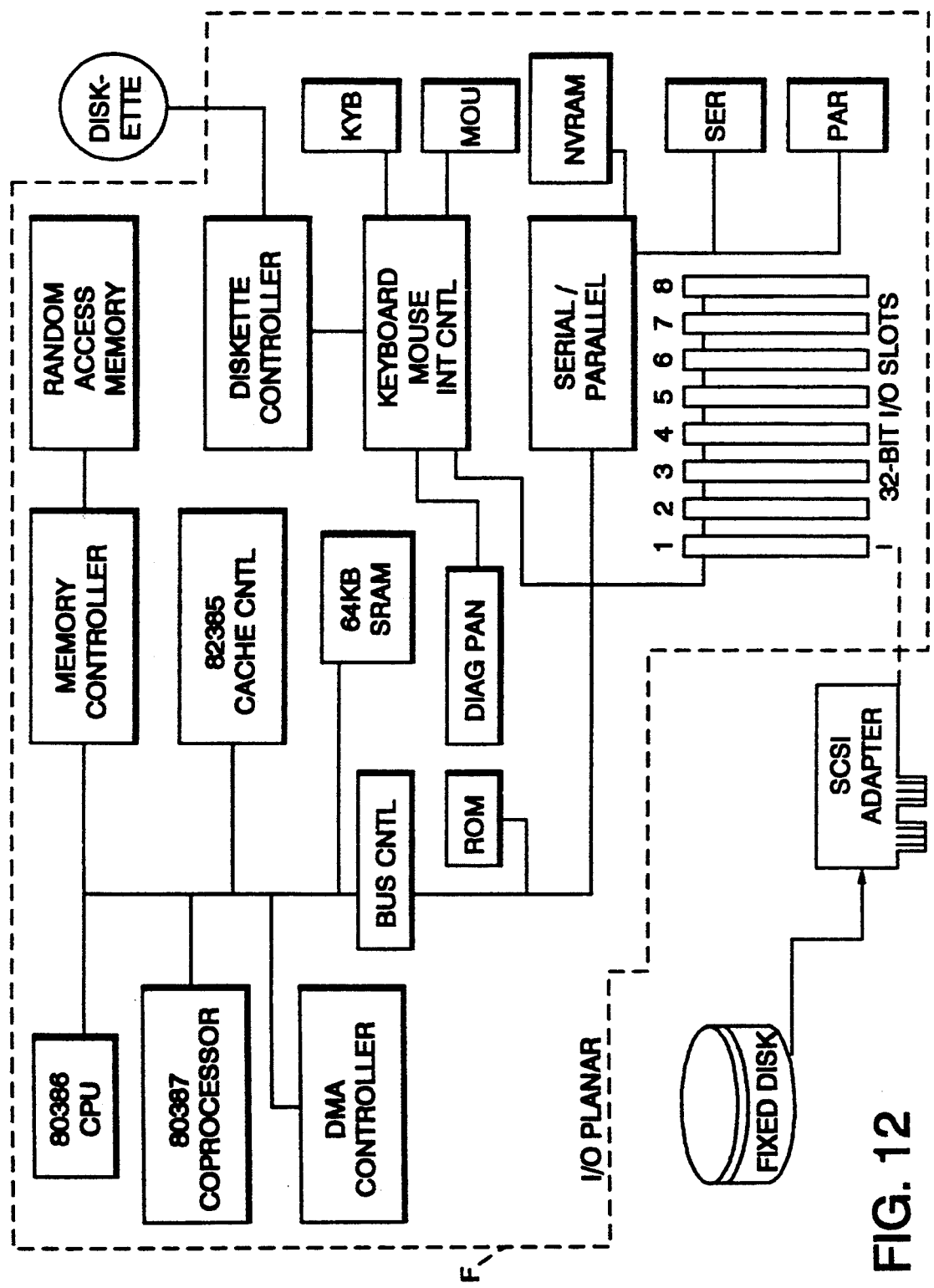
FIG. 12 is a schematic block diagram of a personal computer system in which a system processor, a main memory (RAM) and a read only memory (ROM) are mounted on a single planar board P.

Referring to FIG. 12, there is shown a personal computer system similar to that of FIG. 2, but having a system processor CPU, a nonvolatile memory ROM, a main memory RAM and a nonvolitile memory NVRAM being fixed in a substantially coplanar relationship on a planar board P. According to one feature of the present invention however, the system processor 30 is fixed on the processor card 20 which is removably mounted on the planar board 18.

We now refer to FIGS. 13 through 23 which show additional details of the card 20 (FIG. 2) and the board 18 (FIG. 3). The system 10 includes a frame assembly 1200 upon which the planar board 18 is mounted. The planar board 18 comprises a PCB 106 which is thin, flat, and rectangular, and has its components mounted (e.g., surface mounted) thereon on the surface located away from the frame assembly. Of course, shapes other than rectangular shapes can be used for the PCB106. The processor card 20 is designed to be mounted generally perpendicularly to PCB 106 and, thus, the connectors 108, 110 are located with their mounting grooves (described below) opening in a direction away from the planar board. Connectors 108, 110 are longitudinally aligned, i.e., they are mounted end to end, with the adjacent ends being slightly spaced to allow the connectors to be located with their contact arms correctly spaced to mate with the edge contacts as hereafter described. Each expansion connector 24 is mounted on the planar board parallel to connectors 108, 110. Memory connectors 112 are mounted in parallel rows. The board 18 can include any suitable number of connectors 24, 112.

Figure 13:
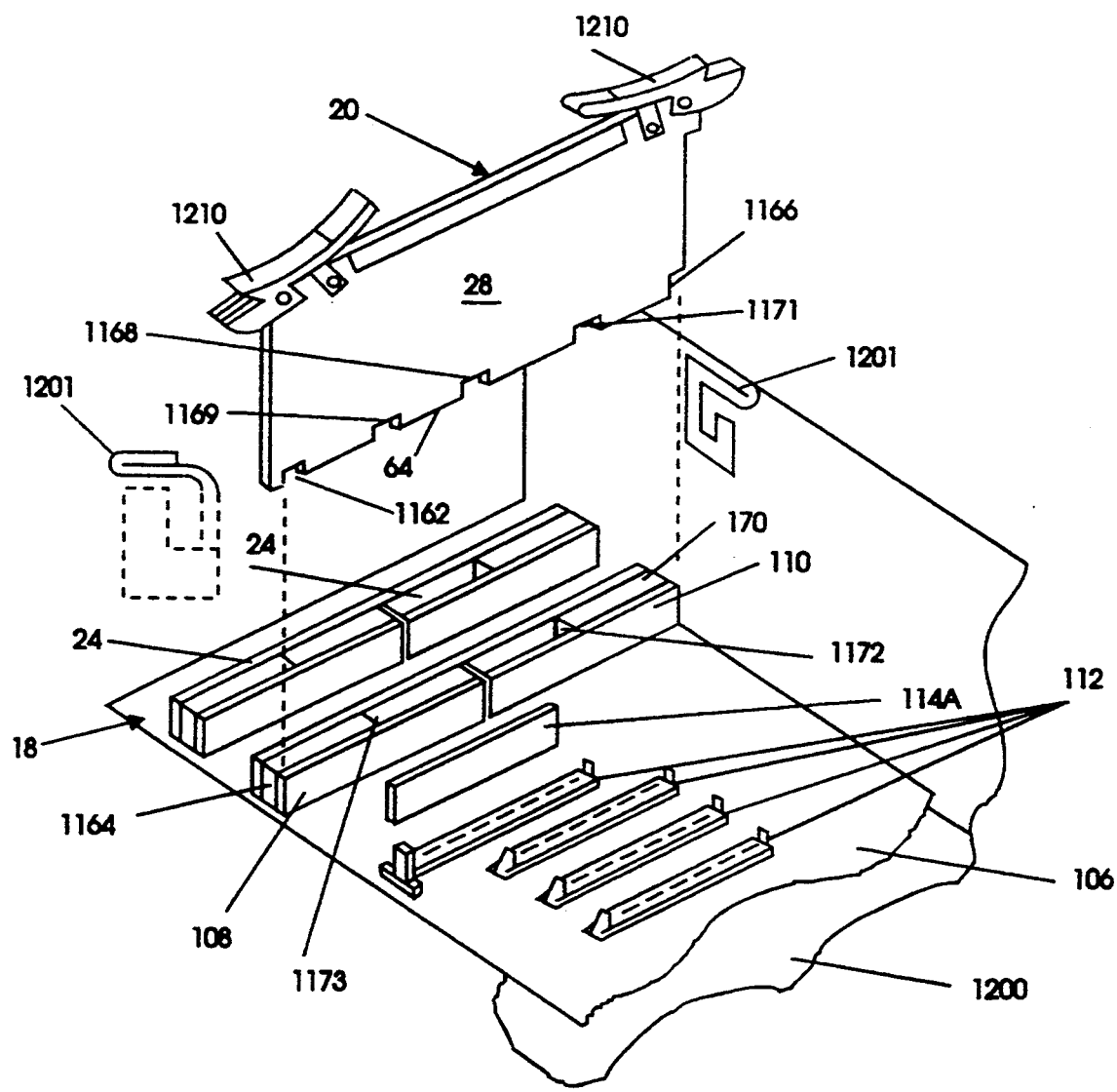
FIG. 13 is an exploded, isometric view, with portions removed, showing a preferred arrangement for mounting a processor card on a planar board.
Figure 14:
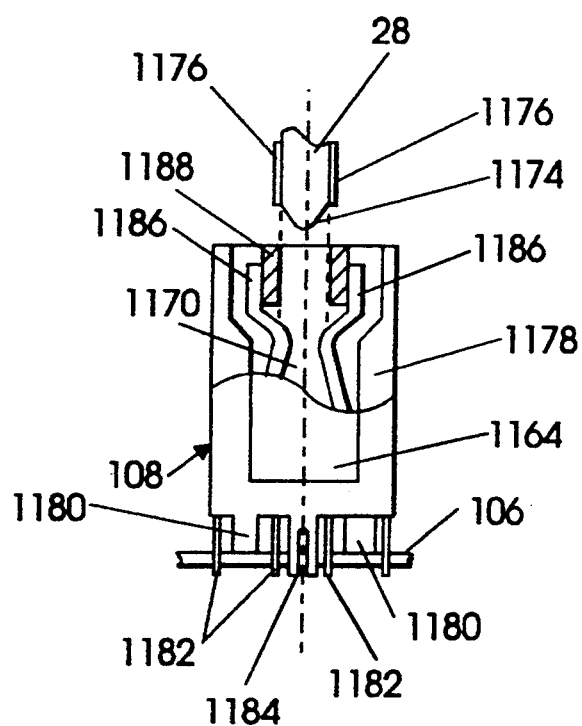
FIG. 14 is an enlarged end elevational view, with portions removed, of an edge connector on the planar board, about to mate with the edge of the processor card.

As seen best in FIG. 13, PCB 28 is flat, thin and rectangular. Of course, PCB28 can have a shape other than a rectangular shape. The lower edge 64 is long and straight and has a first notch 1162 therein providing clearance to fit over an end wall 1164 of the adjacent connector 108. A corner of PCB 28 is notched at 1166 to provide clearance for the opposite end wall of the other connector 110. A central notch 1168 provides clearance to fit over the adjacent end walls of connectors 108, 110. A notch 1171 provides clearance to fit over a key 1172 of connector 110. A notch 1169 has a tight sliding fit over key 1173 of connector 108 to properly locate PCB 28 relative to connectors 108, 110. The keys 1172, 1173 are disposed in the middle of the connectors and serve as reference points for positioning the contact arms in the connectors during the fabrication thereof. During assembly of the planar board, keys 1172, 1173 are used to precisely align and position connectors 108, 110 relative to each other. Thus, only one key and one notch need be used to align the contacts on the processor card 20 with the contact arms in the connectors 108, 110.

The lower edge 64 is beveled at 1174 (FIG. 14) to form a wedge operative to guide such edge between the rows of contact arms when card 20 is installed. Spaced along edge 64 is a multiplicity of contacts 1176 located in two rows on opposite sides of PCB 28. The contacts 1176 form part of the wiring or circuits of the PCB and are evenly spaced in each row with a center to center spacing of, for example, 0.05 inches. The contacts 1176 are very thin and lie substantially flush with the surface of the PCB. The contacts are accurately positioned relative to notch 1169 so that the notch can be used to properly align the mating contacts and contact arms.

Referring now to FIGS. 14–17, there is shown the connector 108 and the card 20. The connector 108 has a generally rectangular transverse cross section and includes an insulating body 1178, a multiplicity of connector pins 1182 and a like multiplicity of contact arms 186 connected to such pins. In the preferred embodiment, connector 108 has one-hundred sixty-four pins, and PCB 28 has three-hundred twenty-eight contacts. Connector 108 is mounted (e.g. surface mounted) on PCB 106 and has a plurality of standoffs 1180 that space the body slightly away from the adjacent surface of PCB 106. Pins 1182 extend thorough PCB 106 and are, for example, reflow soldered thereto to electrically and mechanically mount the connector 108 on PCB 106. A bifurcated locating pin 1184 extends through the PCB and is used to roughly attach the connector to the board during the assembly/fabrication process. Contact arms 1186 are arranged in two rows extending along a groove 1170, the contact arms being flexible, spring members biased or preloaded into engagement with abutments 1188. The contact arms are bent or shaped so as to extend into groove 1170 whereby the spacing between adjacent pins in opposite rows (across groove 1170) is less than the thickness of PCB 28. The contact arms have the same spacing as the contacts 1176. When the processor card is so installed, the bevel 1174 wedges the contact arms apart against the bias thereof to develop a wiping force of at least seventy-five grams per each contact/contact arm engagement thereby ensuring a good electrical contact therebetween. Such wiping force is obviously dependent on the spring constant of the contact arms and the amount of deflection. The use of two commercially available connectors is advantageous because it results in a less expensive design by not requiring any retooling that would otherwise be required to use a new, single connector having the necessary number of contact arms.

Figure 18:
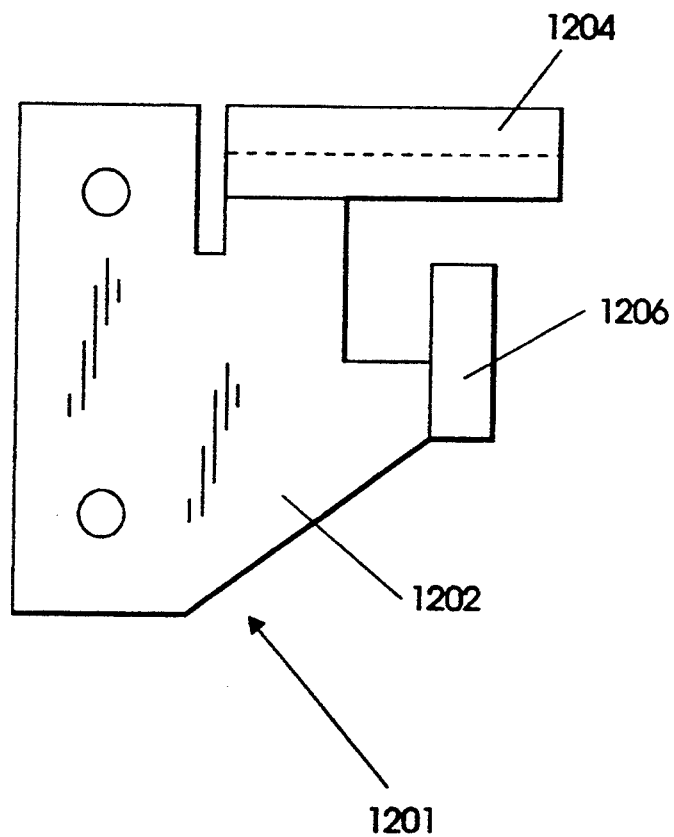
FIG. 18 is a front elevational view of a frame element.
Figure 19:
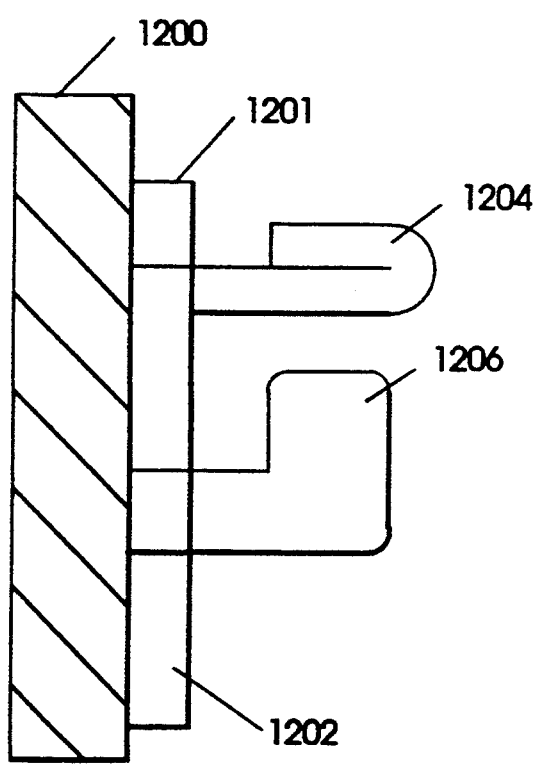
FIG. 19 is an end elevational view of the frame element shown in FIG. 18, mounted on a frame.

Referring again to FIG. 13, two frame elements 1201, which form part of the frame assembly 1200, are mounted in positions adjacent the mounted position of the processor card 20. As shown in FIGS. 18 and 19, each element 1201 is similar so only one needs to be described. Element 1201 is formed of sheet metal and has a flat base 1202, a fulcrum/latch member 1204 that extends outwardly from the base, and a guide 1206 that also extends outwardly from the base at a right angle relative to member 1204 but spaced therefrom.

As shown in FIG. 13, the processor card 20 has two actuators or levers 1210 mounted on opposite corners of the PCB 28 on its top edge. The levers 1210 function as inserters, extractors, and latches to facilitate installation and removal of the card and to lock or latch the card in position. The levers 1210 are identical so only one needs to be described in detail. Referring to FIGS. 20–23, the lever 1210 has an elongated body 1212 provided at one end with a handle 1214. The other end is specially shaped to coact with the frame element in a manner described below in detail. Lever 1210 has a pivot hole 1216 through which a pivot pin 1218 extends allowing the lever to be rotated about the axis of the pin. The pin 1218 is press fitted into PCB 28. The specially shaped end is in the form of an open mouth having an upper jaw 1220 and a lower jaw 1222 providing two fulcrum surfaces 1224, 1226. The lower jaw is split or bifurcated by a slot 1227 having a width slightly greater than the thickness of the guide 1206 to provide a sliding fit therewith. Slot 1227 and guide 1206, when interfitted, occupy the same radial plane relative to the axis of rotation of the lever. Pivot hole 1216 is located closer to jaws 1220, 1222 than to handle 1214 so as to provide unequal moment arms. Handle 1214 is farther from the pivot hole, and hence from the axis of rotation, to provide a longer moment arm than the length of the moment arm to the jaws whereby a force manually applied to handle 1214 is amplified to develop the higher forces necessary to insert and remove card 20. Lever 1210 is a classical class 2 lever where one end acts as the fulcrum, the pivot pin 1218 located between the ends acts as the load, and the handle end receives the actuating force. Lever 1210 further includes two parallel, flexible arms 1228 that are spaced apart a distance slightly greater than the thickness of PCB 28. Two opposed dimples 1230 project towards each other from adjacent sides of arms 1228 and are engageable in holes 1232 in PCB 28 to releasably lock lever 1210 in place against the upper edge of PCB 28. To accomplish this, dimples 1230 and holes 1232 are located the same radial distances from the axes of rotation of the levers.

The two frame elements 1201 are mounted in positions close to where the levers 1210 will be when the processor card 20 is installed or mounted on the planar board 18. The elements 1201 coact with the levers 1210 to install and extract the processor card and, therefore, act to generally align the processor card with connectors 108, 110 at the start of installation. Guides 1206 provide a more accurate aligning function, they being accurately located relative to connectors 108, 110 so that when the levers 1210 are engaged with the guides, PCB 28 is precisely perpendicular to the planar board and lies in a plane extending in the direction of movement of the PCB. When thus aligned, the upper edge of PCB 28 lies directly above connectors 108, 110 and the forces of the levers acting on the PCBs are directed downwardly through the plane of the PCB without introducing any lateral forces that might otherwise bend the PCB and possibly break some of the printed circuits therein.

Figure 15:
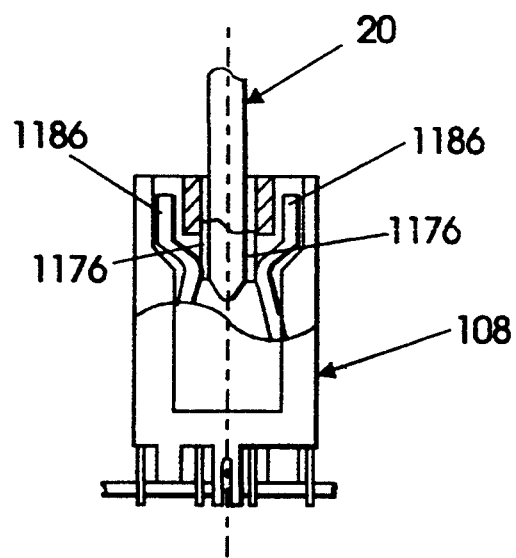
FIG. 15 is a view similar to FIG. 14 showing the edge of the processor card mated with the edge connector.
Figure 16:
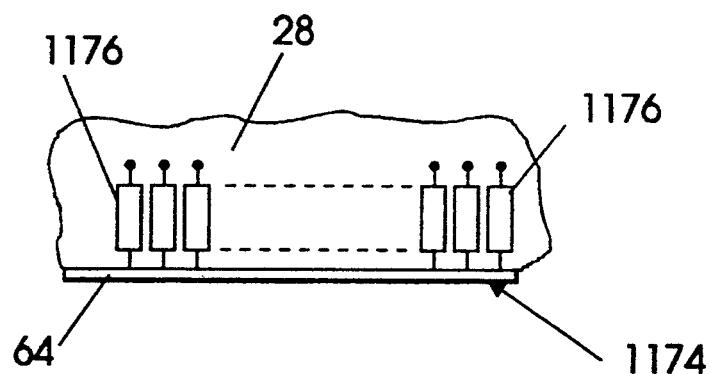
FIG. 16 is an enlarged detail view showing contacts on the edge of the processor card.
Figure 17:
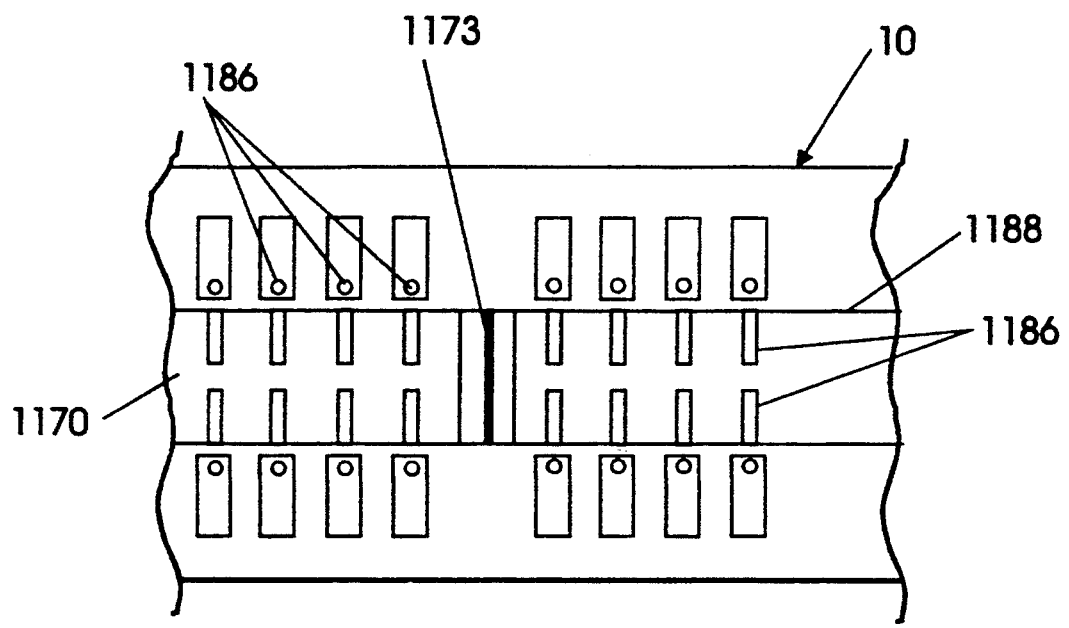
FIG. 17 is a top plan view of a portion of the edge connector.
Figure 20:
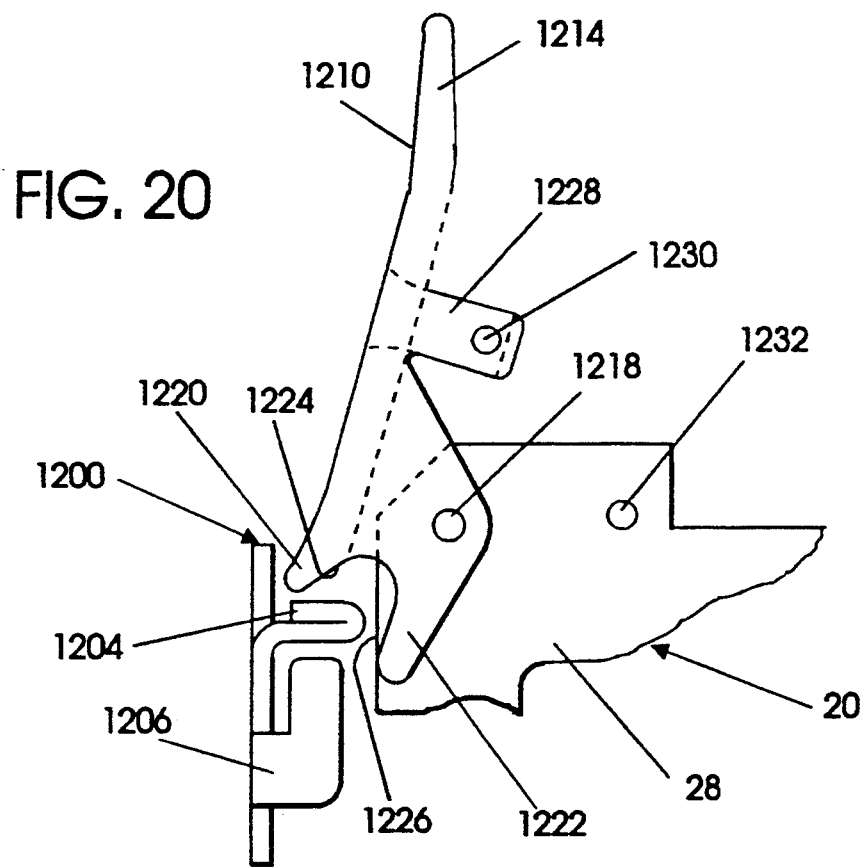
FIGS. 20–22 are elevational views showing progressive relative positions of an actuator and the frame element, as the processor card is mounted on the planar board.
Figure 21:
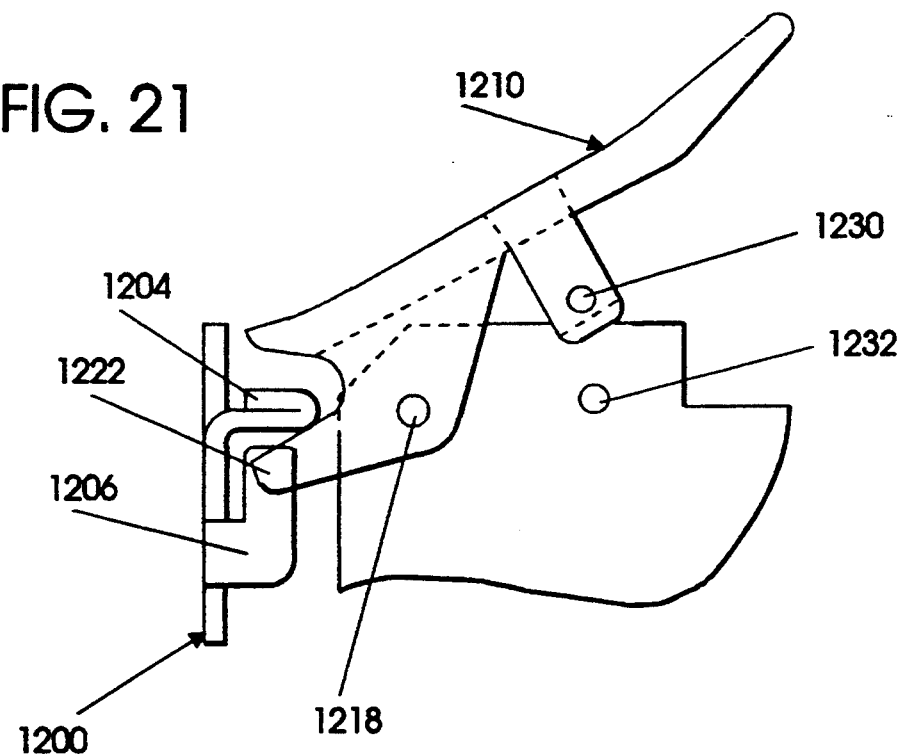
Figure 22:
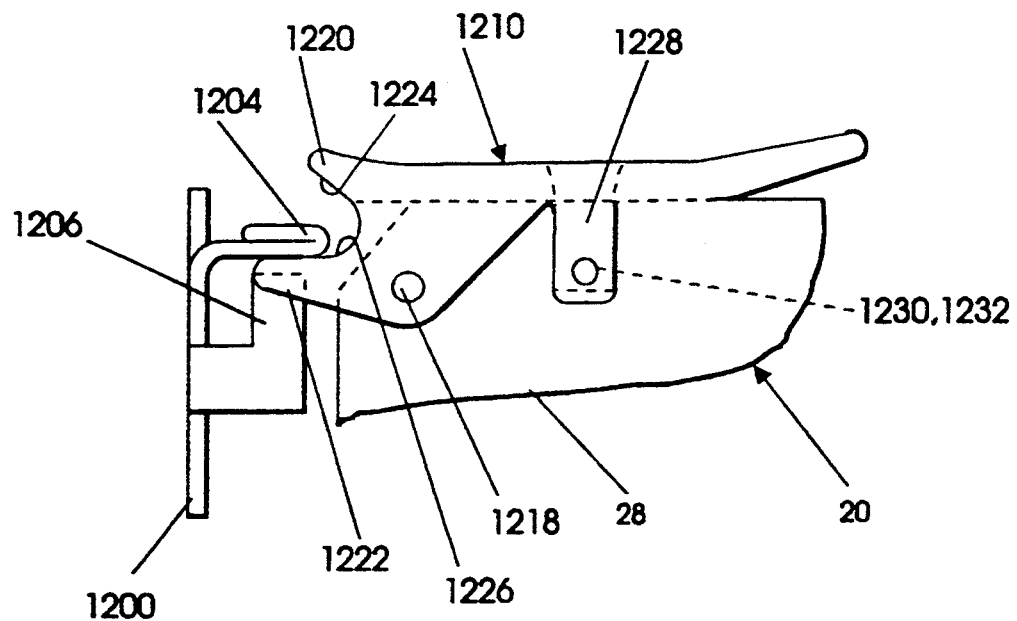
Figure 23:
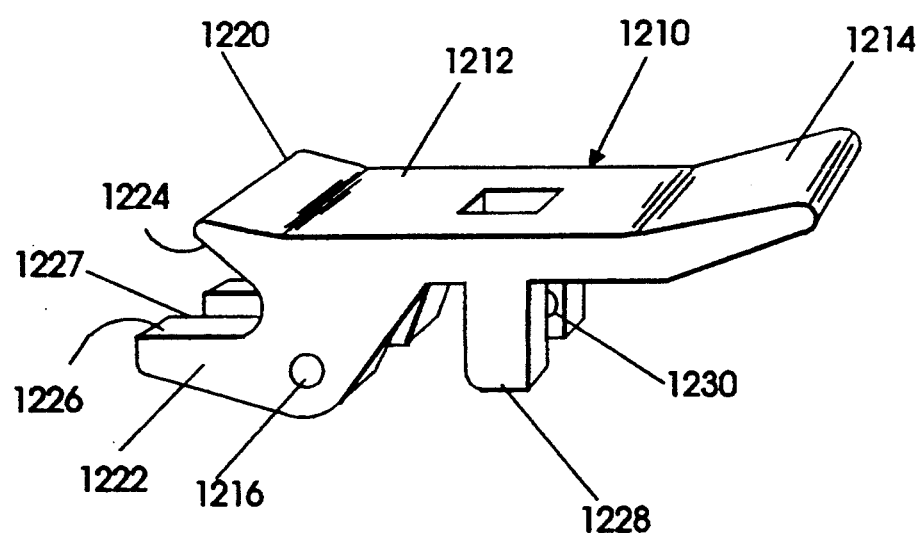
FIG. 23 is a perspective view of the actuator.

In order to install or mount the processor card 20 on the planar board 18, the levers 1210 are rotated to an open position wherein they extend above PCB 28 and provide handles for lifting and guiding edge 64 into connectors 108, 110. In such position, as best seen in FIG. 20, each jaw 1222 is displaced from fulcrum 1204 to allow the jaw to be lowered past the fulcrum 1204. During the process of lowering, each lever 1210 is concurrently rotated clockwise as viewed in FIG. 20. The levers would be moved laterally as necessary to align slots 1227 with guide 1206 and thereby allow the guide to enter the slots as continued rotation occurs. Such movement causes surface 1226 to abut fulcrum 1204 on the undersurface thereof. This should occur about at the point when edge 1174 is resting on top of contact arms 1186. Continued rotation of lever 1210 forces the lower edge bevel 1174 to wedge the rows of contact arms 1186 apart against the bias thereof while lowering edge 64 between the contact arms (FIG. 15). During such lowering, surface 1226 slides on the underside of fulcrum 1204 and passes through the position shown in FIG. 21. Rotation continues until the underside of body 1212 of lever 1210 abuts the adjacent top edge of PCB 28 as shown in FIG. 22. As the lever moves into this latter position, arms 1228 straddle PCB 28 and the dimples 1230 slide thereover until they move into locking hole 1232 in PCB 28. The dimples are spherical and, in conjunction with the flexibility of arms 1228, provide a releasable latch or lock to hold lever 1210 in the latched position. At such point, surface 1226 abuts the underside of fulcrum 1204 and thereby prevents upward movement of PCB 28 until such time as lever 1210 is rotated in the opposite direction. Removal is accomplished by simply rotating the levers to initially overcome the force needed to move the dimples from holes 1232 and the frictional forces holding the lower edge 64 in connectors 108, 110. Such latter rotation brings surface 1224 of the upper jaw 1220 into contact with the upper surface of fulcrum 1204 allowing the lever to amplify the forces manually applied thereto causing such rotation. Continued rotation will separate PCB 28 from the connectors 108, 110 allowing the processor card 20 to be lifted away from the planar board 18.

Although specific preferred details for removably mounting the processor card 20 on the planar board 18 have been shown and described, other (e.g., conventional) arrangements could be employed for removably mounting the card on the board. For example, other mounting arrangements are shown and described in U.S. Pat. Nos. 4,548,452, "High-Density Electrical Contact Pad Pattern", issued Oct. 22, 1985; 4,832,617, "Circuit Board Socket, Contact and Method of Manufacture", issued May 23, 1989; and 4,846,734, "Vertical Edge Card Connectors", issued Jul. 11, 1989 which are hereby incorporated herein by reference. However, the electrical and mechanical performance of the processor card and the planar board when they have other mounting arrangements may differ from their performance when they include the preferred details shown in FIGS. 13–23.

BIOS

Previous to the present invention, the ROM of planar board P (FIG. 12) could include all of the BIOS code which interfaces the operating system to the hardware peripherals. According to one aspect of the present invention, however, ROM 44 (FIG. 2) is adapted to store only a portion of BIOS. This portion, when executed by the system processor 30, inputs from either the fixed disk 16 or diskette 12 a second or remaining portion of BIOS, hereinafter also referred to as a BIOS image. This BIOS image supersedes the first BIOS portion and being an integral part of the system 10 is resident in main memory such as RAM 114A, 114B. The first portion of BIOS (ROM-BIOS) as stored in ROM 44 will be explained generally with respect to FIGS. 4–5 and in detail with respect to FIGS. 7–10. The second portion of BIOS (BIOS image) will be explained with respect to FIG. 6, and the loading of the BIOS image with respect to FIG. 11. Another benefit from loading a BIOS image from one of the DASD is the ability to load BIOS directly into the system processor's RAM 114A, 114B. Because accessing RAM is much faster than accessing ROM, a significant improvement in the processing speed of the computer system is achieved.

The explanation will now proceed to the operation of the BIOS in ROM 44 and to the operation of loading the BIOS image from either the fixed disk or diskette. In general, ROM-BIOS prechecks the system and loads a BIOS master boot record into RAM. The master boot record includes a data segment having validation information and a code segment having executable code. The excutable code uses the data information to validate hardware compatibility and system configuration. After testing for hardware compatibility and proper system configuration, the executable code loads the BIOS image into RAM. The BIOS image succeeds ROM-BIOS and loads the operating system to begin operation of the machine. For purposes of clarity, the executable code segment of the master boot record will be referred to as MBR code while the data segment will be referred to as MBR data.

Figure 4:
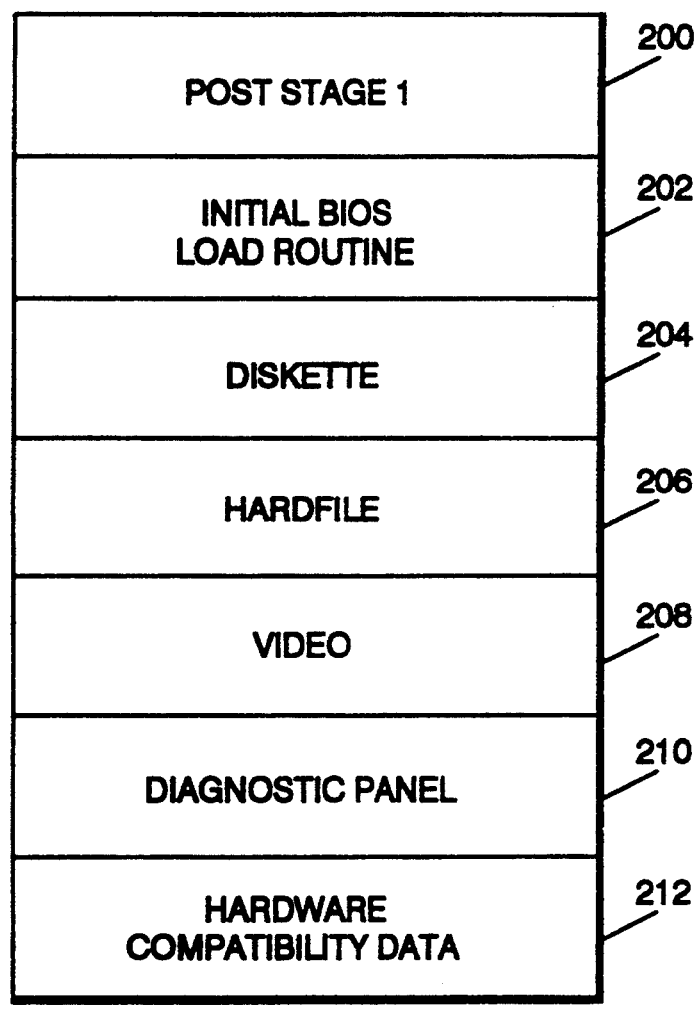
FIG. 4 is a memory map for the ROM BIOS included on the processor card of FIG. 2.

Referring to FIG. 4, there is a memory map showing the different code modules which comprise ROM-BIOS. ROM-BIOS includes a power on self test (POST) stage I module 200, an Initial BIOS Load (IBL) Routine module 202, a Diskette module 204, a hardfile module 206, a video module 208, a diagnostic-panel module 210, and hardware compatibility data 212. Briefly, POST Stage I 200 performs system pre-initialization and tests. The IBL routine 202 determines whether the BIOS image is to be located from disk or diskette, checks compatibility and loads the master boot record. Diskette module 204 provides input/output functions for a diskette drive. Hardfile module 206 controls I/O to a fixed disk or the like. Video module 208 controls output functions to a video I/O controller which is further connected to a video display. Diagnostic panel module 210 provides control to a diagnostic display device for the system. The hardware compatibility data 212 includes such values as a system model and submodel values which are described later with respect to FIG. 6.

Figure 5:
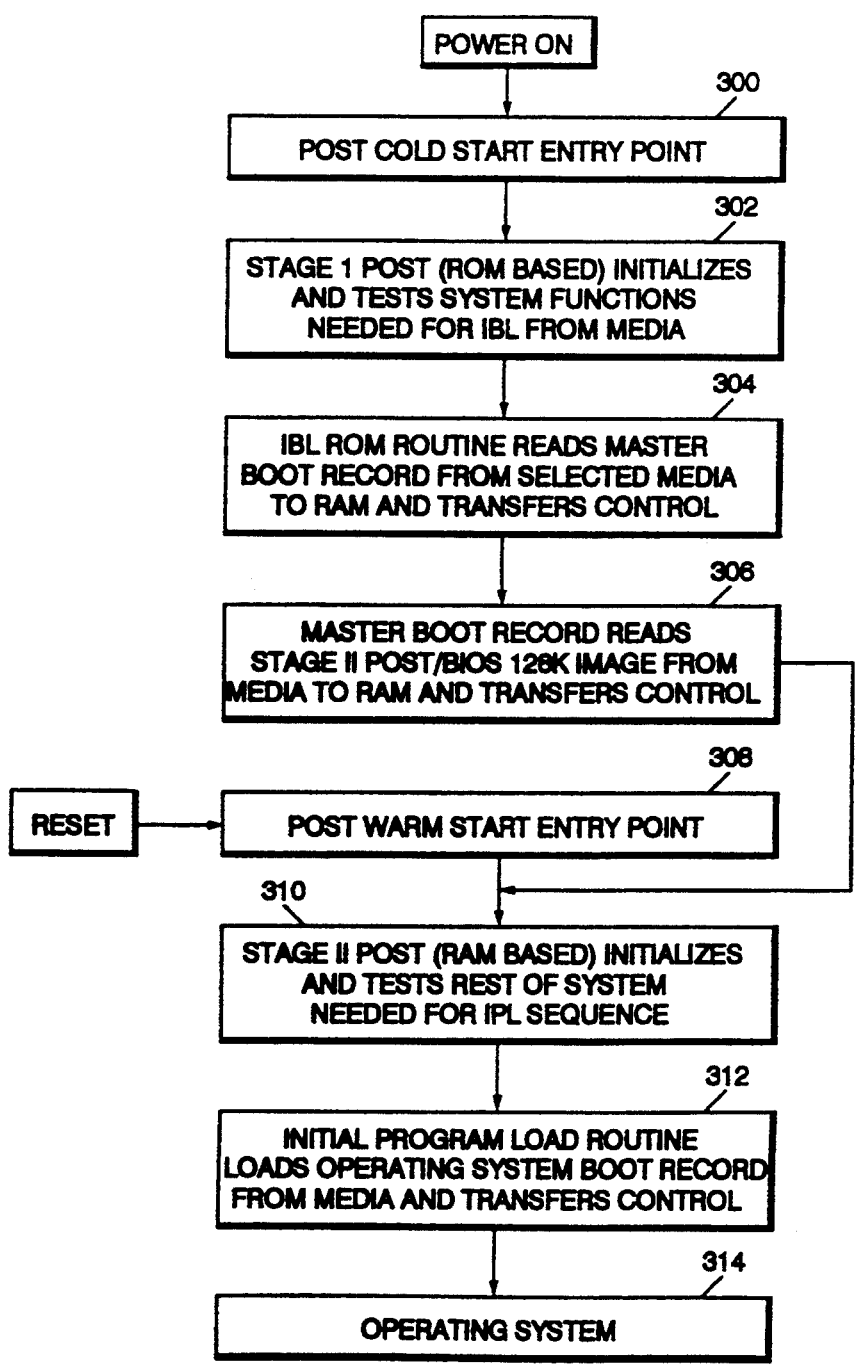
FIG. 5 is a flowchart describing the overall process for loading a BIOS image from a direct access storage device.

Referring now to FIG. 5, there is shown a process overview for loading a BIOS image into the system from either the fixed disk or the diskette. When the system is powered up 300, the system processor is vectored to the entry point of POST Stage I, step 302. POST Stage I initializes the system and tests only those system functions needed to load BIOS image from the selected DASD, step 304. In particular, POST Stage I initializes the processor/planar functions, diagnostic panel, memory subsystem, interrupt controllers, timers, DMA subsystem, fixed disk BIOS routine (Hardfile module 206), and diskette BIOS routine (Diskette module 204), if necessary.

After POST Stage I pre-initializes the system, POST Stage I vectors the system processor to the Initial BIOS Load (IBL) routine included in the Initial BIOS Load module 202. The IBL routine first, determines whether the BIOS image is stored on fixed disk or can be loaded from diskette; and second, loads the master boot record from the selected media (either disk or diskette) into RAM and transfers control to the master boot record, step 304. The master boot record includes the MBR data and the MBR code. The MBR data is used for verification purposes and the MBR code is executed to load in the BIOS image. A detailed description of the operation of the IBL routine is presented with respect to FIGS. 7–10.

With continuing reference to FIG. 5, after the IBL routine loads the master boot record into RAM, the MBR code performs a series of validity tests to determine the authenticity of the BIOS image and to verify the configuration of the system. For a better understanding of the operation of the MBR code, attention is directed to FIG. 11 of the drawings wherein the MBR code is described in greater detail.

On the basis of these validity tests, the MBR code loads the BIOS image into RAM and transfers control to the newly loaded BIOS image in main memory, step 306. In particular, the BIOS image is loaded into the address space previously occupied by ROM-BIOS. That is if ROM-BIOS is addressed from E0000H through FFFFFH, then the BIOS image is loaded into this RAM address space thus superseding ROM-BIOS. Control is then transferred to POST Stage II which is included in the newly loaded BIOS image thus abandoning ROM-BIOS. POST Stage II, now in RAM, initializes and tests the remaining system in order to load the operating system boot, step 310. After the system is initialized and tested, POST Stage II transfers control to the operating system boot record to load the operating system, steps 312–314. It is noted that during a warm start, the processor is vectored to step 308, bypassing steps 300–306. It is also noted that during a reset, the processor is vectored to step 308, bypassing steps 300–306.

Figure 6:
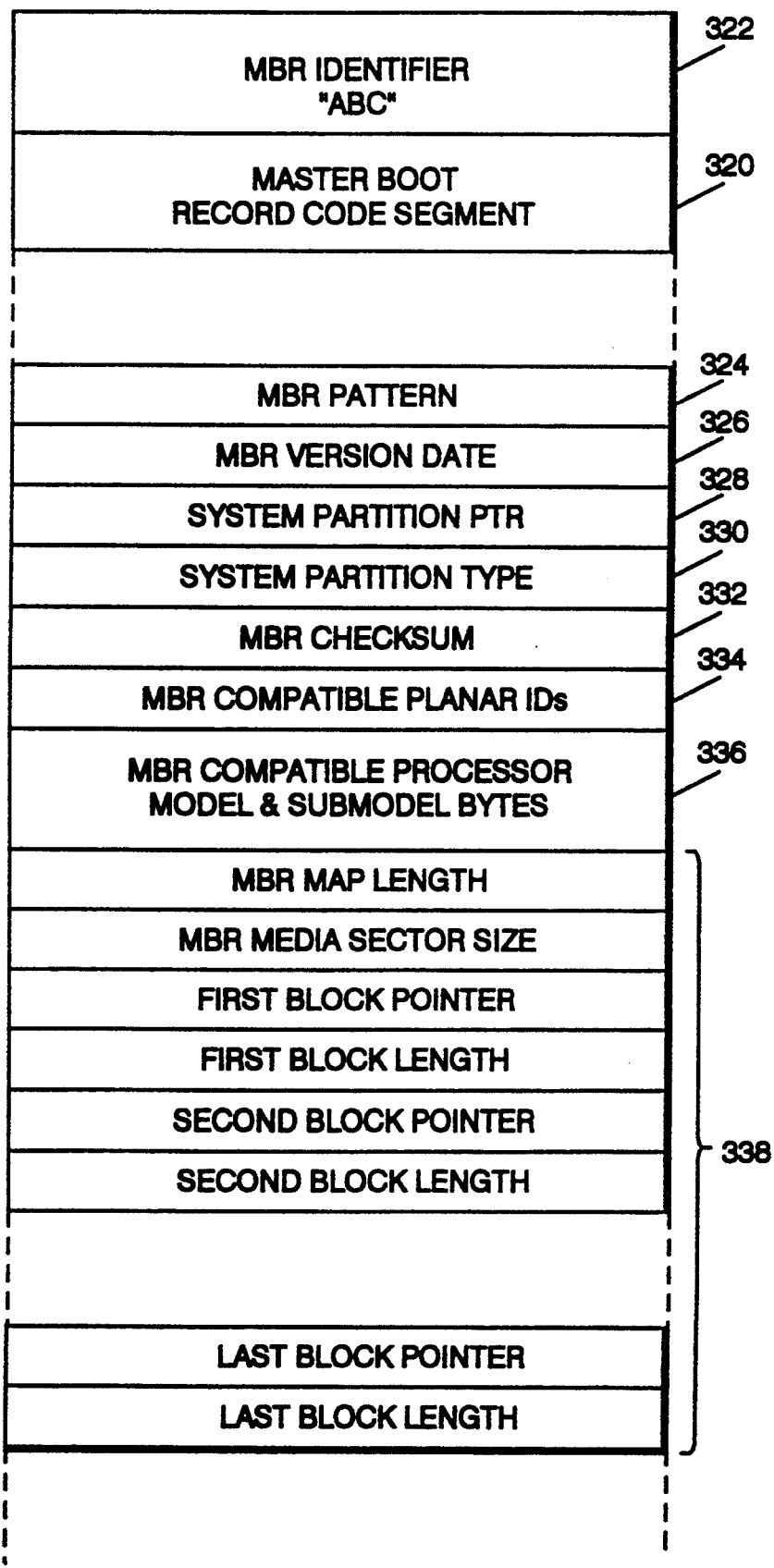
FIG. 6 illustrates the record format for the master boot record.

For clarity, it is appropriate at this point to illustrate a representation for the format of the master boot record. Referring to FIG. 6, there is shown the master boot record. The boot record includes the executable code segment 320 and data segments 322–338. The MBR code 320 includes DASD dependent code responsible for verifying the identity of the ROM-BIOS, checking that the IBL boot record is compatible with the system, verifying the system configuration, and loading the BIOS image from the selected DASD (disk or diskette). The data segments 322–338 include information used to define the media, identify and verify the master boot record, locate the BIOS image, and load the BIOS image.

The master boot record is identified by a boot record signature 322. The boot record signature 322 can be a unique bit pattern, such as a character string "ABC", in the first three bytes of the record. The integrity of the master boot record is tested by a checksum value 332 which is compared to a computed checksum value when the boot record is loaded. The data segments further include at least one compatible planar ID value 334, compatible model and submodel values 336. The master boot record's planar ID value defines the planar for which the master boot record is valid. Similarly, the master boot record's model and submodel values define the processor and planar board I/O configuration, respectively, for which the master boot record is valid. It is noted that the boot record's signature and checksum identify a valid master boot record, while the boot record's planar ID, boot record's model and boot record's submodel comparisons are used to identify a boot record compatible with the system and to determine if the system configuration is valid. Another value, boot record pattern 324 is used to determine the validity of the ROM-BIOS. The boot record pattern 324 is compared to a corresponding pattern value stored in ROM. If the values match, this indicates that a valid ROM-BIOS has initiated the load of a BIOS image from the selected media.

The following description further describes in greater detail each of the values in the master boot record and their functions:

MBR Identifier (322): The first three bytes of the master boot record can consist of characters, such as "ABC". This signature is used to identify a boot record.

MBR Code Segment (320): This code verifies the compatibility of the boot record with the planar and the processor by comparing corresponding planar ID and model/submodel values. If these values match, it will load the BIOS image from the chosen media to system RAM. If the system image (BIOS image loaded into memory) checksum is valid and no media load errors occur, the MBR code will transfer control to the POST Stage II routine of the system image.

MBR Pattern (324): The first field of the master boot record data segment contains a pattern, such as a character string "ROM-BIOS 1989". This string is used to validate the ROM-BIOS by comparing the Boot Pattern value to the corresponding value stored in ROM (ROM-Pattern).

MBR Version Date (326): The master boot record includes a version date for use by an update utility.

System Partition Pointer (328): The data segment contains a media pointer to the beginning of the media system partition area for use by Stage II POST. On an IBL diskette, the pointer is in track-head-sector format; on disk the pointer is in Relative Block Address (RBA) format.

System Partition Type (330): The system partition type indicates the structure of the media system partition. There are three types of system partition structures—full, minimal and not present. The full system partition contains the setup utility and diagnostics in addition to the BIOS image and master boot record. The minimal system partition contains just the BIOS image and master boot record. It may occur where a system does not have access to a hardfile having an IBL image, in this circumstance the system partition type indicates not present. In this instance, IBL will occur from the diskette. These three system partition types allow flexibility in how much space the system partition takes up on the media.

MBR Checksum Value (332): The checksum value of the data segment is initialized to generate a valid checksum for the record length value (1.5K bytes) of the master boot record code.

MBR Planar ID Value (334): The data segment includes a value, such as a string of words defining compatible planar IDs. Each word is made up of a 16 bit planar ID and the string is terminated by word value of zero. If a system's planar ID matches the planar ID value in the master boot record, such as one of the words in the string, the IBL media image is compatible with the system planar. If the system's planar ID does not match any word in the string, the IBL media image is not compatible with the system planar.

MBR Model and Submodel Values (336): The data segment includes values, such as a string of words defining compatible processors. Each word is made up of a model and submodel value and the string is terminated by a word value of zero. If a system's model and submodel value (stored in ROM) match one of the words in the string, the IBL media image is compatible with the system processor. If the ROM model and ROM submodel values do not match any word in the string, the IBL media image is not compatible with the system processor.

MBR Map Length (338): The MBR map length is initialized to the number of media image blocks. In other words, if the BIOS image is broken into four blocks, the map length will be four indicating four block pointer/length fields. Usually this length is set to one, since the media image is one contiguous 128K block.

MBR Media Sector Size (338): This word value is initialized to the media sector size in bytes per sector.

Media Image Block Pointer (338): The media image block pointer locates a system image block on the media. Normally, there is only one pointer since the media image is stored as one contiguous block. On an IBL diskette, the pointers are in track-head-sector format; on disk the pointers are relative block address format.

Media Image Block Length (338): The media image block length indicates the size (in sectors) of the block located at the corresponding image block pointer. In the case of a 128 k contiguous media image, which includes space for BASIC, this field is set to 256, indicating that the BIOS image block takes up 256 sectors (512 bytes/sector) starting at the media image block pointer location.

Referring now to FIGS. 7–10, there is shown a detailed flow chart of the operation of the IBL routine. Under normal circumstances, the IBL routine loads the master boot record from the system fixed disk into RAM at a specific address and then vectors the system processor to begin executing the code segment of the master boot record. The IBL routine also contains provisions for a diskette default mode in which the master boot record can be loaded from diskette. However, the IBL routine does not allow the diskette default mode to be performed if the system contains the IBL media on the system fixed disk and a valid password is present in NVRAM. The user has the option of setting the password in NVRAM. The purpose of preventing the diskette default mode from being effected is to prevent loading an unauthorized BIOS image from diskette. In other words, the diskette default mode is used only when a system fixed disk is not operational and the user has indicated (by not setting the password) the desire to be able to load from the diskette. If the IBL routine is not able to load the master boot record from either media, an error message is generated and the system is halted.

Figure 7:
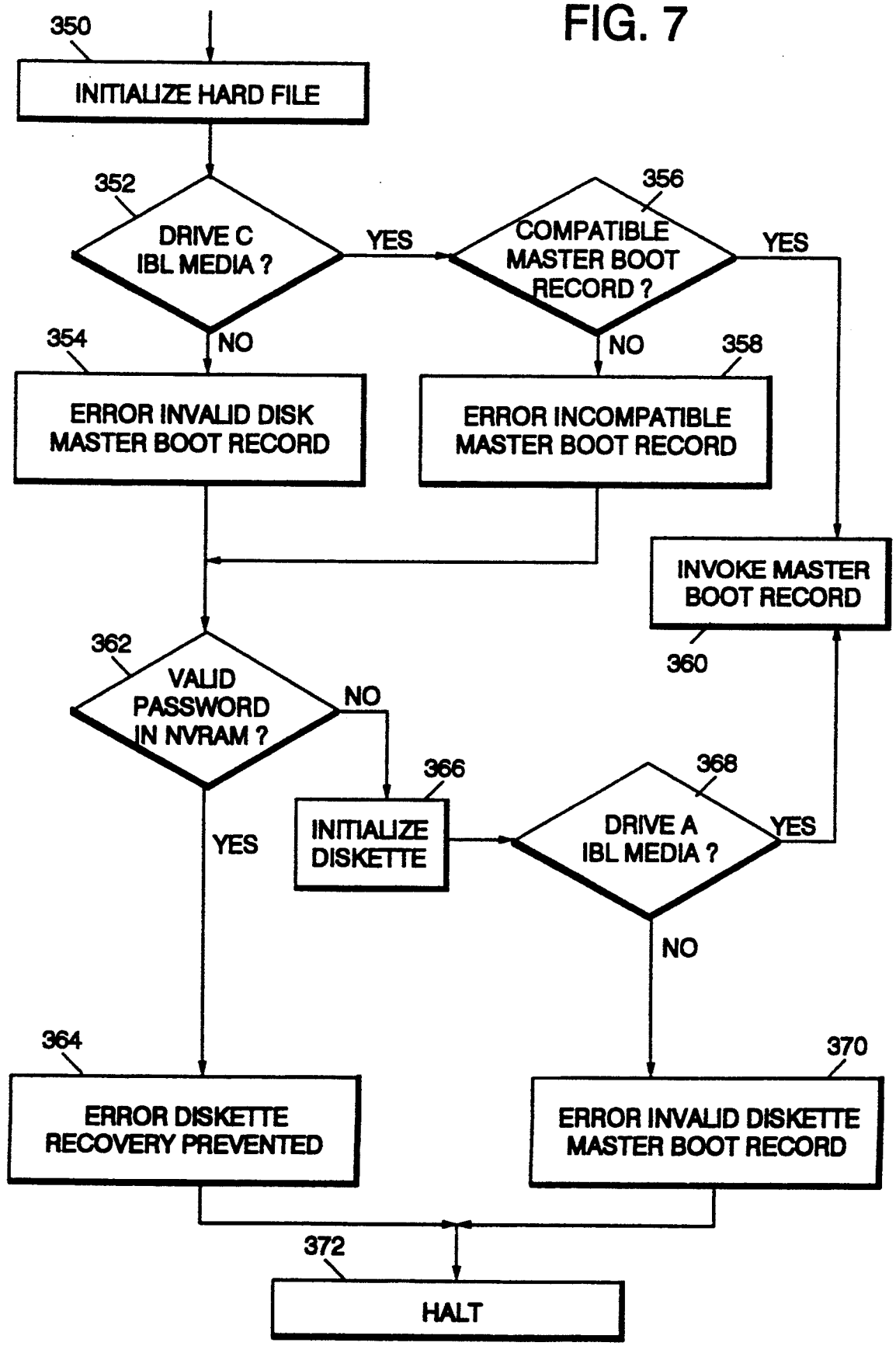
FIG. 7 is a flowchart describing the operation of the IBL routine.
Figure 8:
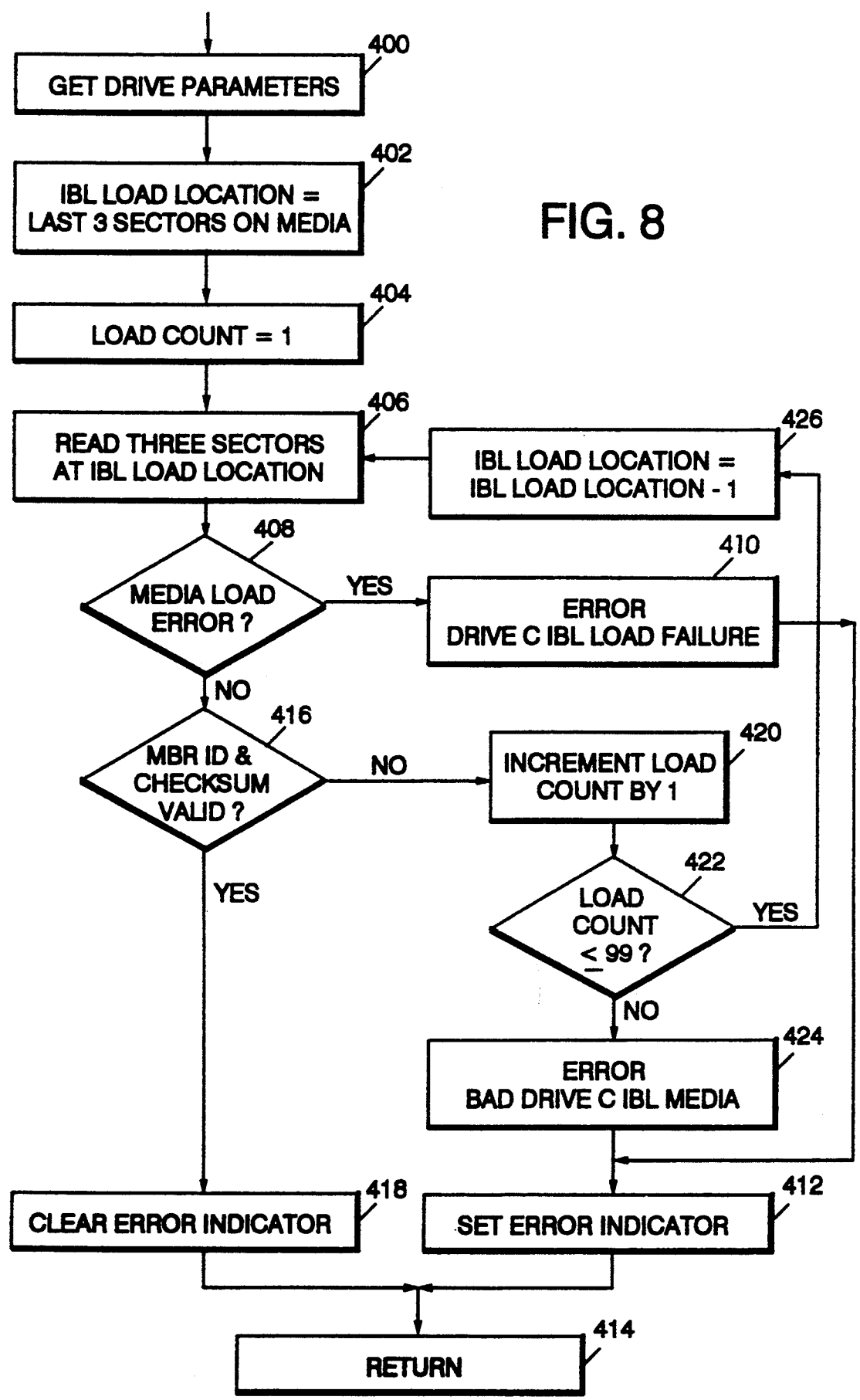
FIG. 8 is a flowchart showing the steps for loading the master boot record from a fixed disk.

Referring now to FIG. 7, under normal circumstances the system will contain a system fixed disk which the IBL routine initializes, step 350. Assume for purposes of illustration that the fixed disk is configured for Drive C of the personal computer system. Similarly, assume Drive A is designated as the diskette drive. The IBL routine then examines Drive C to determine whether it contains IBL media, step 352. Attention is directed to FIG. 8 which describes in detail this process. The IBL routine starts reading from the fixed disk at the last three sectors and continues reading, decrementing the media pointer, for 99 sectors or until a valid master boot record is found. If a master boot record is found, it is checked for system planar and processor compatibility, step 356. If it is not planar or processor compatible, then an error is reported, step 358. Referring back to step 352, if no master boot record is found on the last 99 sectors of the fixed disk (primary hardfile), an error is reported, step 354.

Referring back to step 356, if a master boot record is found, a series of validity checks is performed to determine if the master boot record is compatible with the computer system. Additionally, the configuration of the system is checked. Attention is directed to FIG. 10 which discloses this process in greater detail. If the boot record is compatible with the planar ID, model and submodel, and if furthermore the system configuration has not changed, the master boot record is loaded and the code segment of the master boot record is executed, step 360.

Referring back to steps 354 and 358, if an error occurs in loading the master boot record from the fixed disk or if a fixed disk is not available, the IBL routine determines if a valid password is included in NVRAM, step 362. This password determines whether the BIOS image can be loaded from diskette. Note that the password will exist only upon being installed by the user running a setup utility. If a password is installed in NVRAM, the BIOS image is prevented from being loaded from diskette, step 364. This permits the user to ensure the integrity of the operation of the system by causing the system to be loaded only with the BIOS image on the fixed disk. The password can take the form of a string of characters stored in NVRAM. The IBL routine then halts, step 372.

Figure 9:
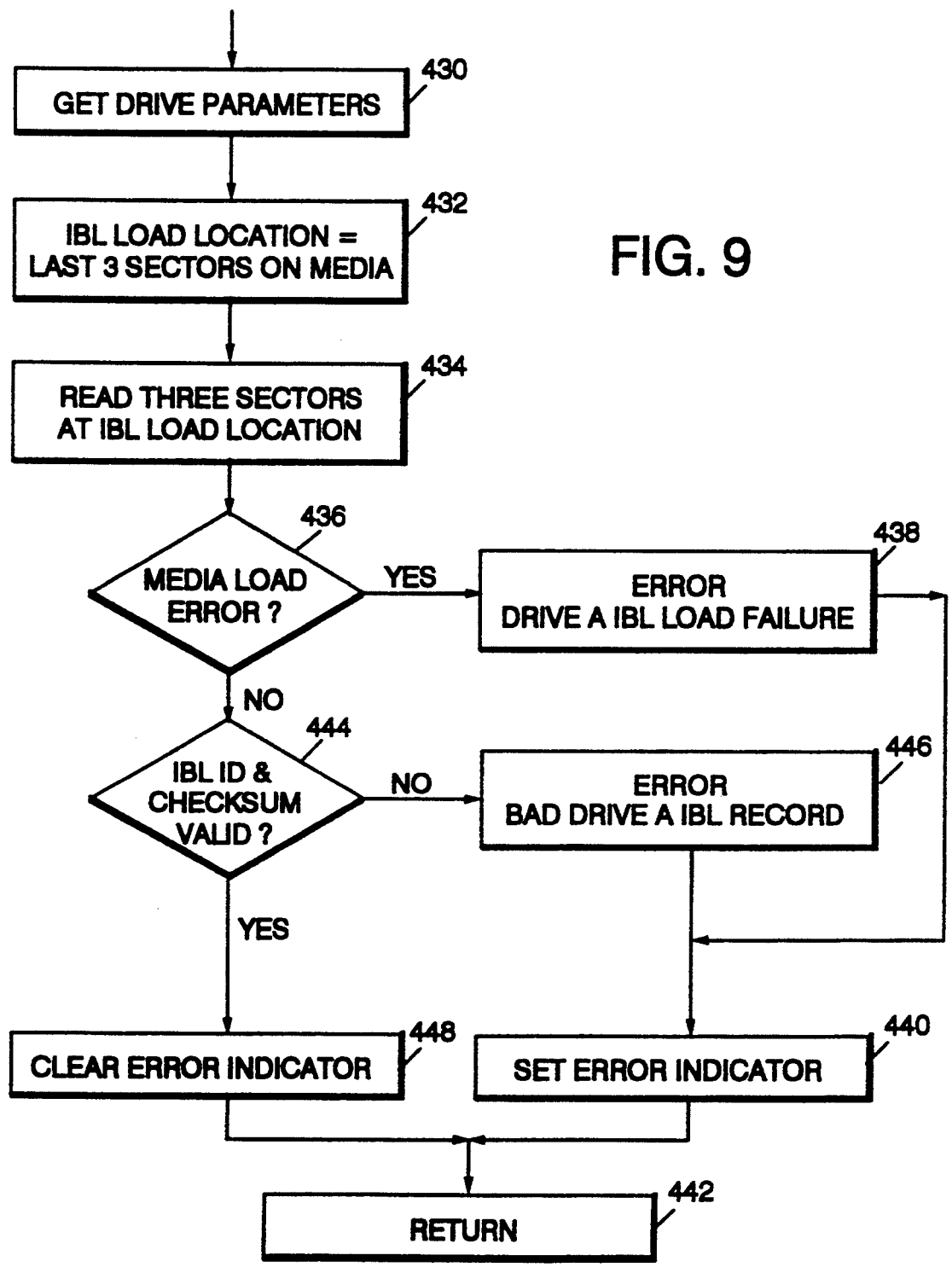
FIG. 9 is a flowchart showing the steps for loading the master boot record from a diskette.

Referring back to step 362, if a valid password in NVRAM is not present, thus allowing BIOS image to be loaded from diskette, the IBL routine initializes the diskette subsystem, step 366. The IBL routine then determines if Drive A includes the IBL media on a diskette, step 368. If Drive A does not include IBL media, an error is generated to notify the user that an invalid diskette has been inserted in the drive, step 370. The system then halts, step 372. Attention is directed to FIG. 9 for a more detailed discussion of step 368.

Referring back to step 368, after Drive A is checked for IBL media, the master boot record is loaded into RAM and the code segment included in the master boot record is executed, step 360. It is important to note that for diskette the IBL routine does not include the compatibility checks that are used with the fixed disk system. The reason for the absence of the compatibility checks is for loading a noncompatible IBL image from diskette. For example, if a new processor is added to the system, a new BIOS image will be included on a diskette. Because a new processor card will cause compatibility errors when loading from fixed disk, the IBL routine provides the ability to bypass these tests by loading the BIOS image from diskette.

To recapitulate, the master boot record is checked for compatibility with the system through matching the system planar ID and processor model/submodel values to the boot record values. For disk, this check is done first in the IBL routine 202 and then done again in the master boot record. The first check (in the IBL routine) is done to make sure the boot record is compatible with the system; the second check (in the master boot record) is done to ensure a compatible ROM passed control to the boot record. Notice that the check done in the disk master boot record will never fail for a compatible ROM because the IBL routine will have already checked the compatibility. In contrast, the IBL routine compatibility check is not done for diskette. The planar/processor compatibility is checked only during diskette master boot record execution. This method allows future modifications in loading a new BIOS image from a system reference diskette.

In view of the description of the IBL routine of FIG. 7, the explanation will now proceed to a comprehensive and full understanding of the validity tests discussed previously. Referring to FIG. 8, there is shown a detailed flowchart of step 352 of FIG. 7, to determine if a valid master boot record is on drive C. The process begins by obtaining the drive parameters to enable the IBL routine to access drive C, step 400. An IBL load location is set to the last three sectors from the disk (the last three sectors normally contain the master boot record), step 402. A load count indicating the number of attempts to read a master boot record from disk is set to 1, step 404. Three sectors are read from disk at the IBL load location, step 406. Any disk drive errors are detected and if a disk drive read error occurs it is reported, steps 408–410. The process then returns with an error indication, steps 412–414.

Referring back to step 408, if no drive error occurs, the disk record is scanned for the master boot record signature, step 416. The boot record signature, such as the characters "ABC", are compared to the first three bytes of the disk record. If the disk record does have a valid boot record signature (characters "ABC") and the checksum computed from the disk record loaded into memory equals the boot record checksum, the disk record is indicated as being a valid boot record with no errors, step 418. The process then returns, step 414.

Referring back to step 416, if the boot record signature or checksum is invalid, the load count is incremented by 1, step 420. The load count is then compared to a predetermined constant such as 99, step 422. If 99 attempts to read a boot record have resulted in failure, an error is indicated and the process returns, steps 424, 412 and 414. If less than 99 attempts to read a boot record have occurred, the IBL load location is decremented by one and three new sectors are read from the new load location, steps 426 and 406. Thus, if a valid master boot record cannot be loaded from the last 99 sectors (equivalent to 33 copies), then an error condition is set and control returns to the IBL routine.

Referring now to FIG. 9, there is shown a detailed flow diagram for loading the master boot record from diskette on drive A. First, the diskette drive parameters to access drive A are retrieved, step 430. The IBL load location is set to the last 3 sectors on diskette (cylinder, head and sector format), step 432. The last 3 sectors are read, step 434. If a diskette drive error is detected an error is indicated, steps 436–438. An error condition is set and control is returned to the IBL routine, steps 440–442.

Referring back to step 436, if no drive error is detected, the diskette record is checked for boot record signature and the checksum is calculated, step 444. If the boot record signature is missing or checksum is invalid, an error is indicated and control returned to the IBL routine, steps 444, 446, 440 and 442. If a valid boot record signature and valid checksum are detected, an indication is set and control is returned to the IBL routine, steps 448 and 442. It is noted that, in a diskette load, the IBL routine does not search through the media as in the fixed disk load. Therefore, in a diskette load, the master boot record must be stored in a specific location of the diskette (e.g., last three sectors).

Finally, FIG. 10 shows how the IBL routines tests for system planar and processor compatibility and for a proper system configuration. The master boot record is checked for compatibility with the system planar by comparing the boot record planar ID value to the system planar ID read by the system processor, step 460. If the system planar ID does not match any of the master boot record planar ID values, this indicates this master boot record is not compatible with this planar. An error is indicated and control is returned to the IBL routine, steps 462, 464, and 466.

If the master boot record is compatible with the planar, the master boot record is checked for compatibility with the processor, step 468. The boot record model and submodel byte values are compared to the model and submodel values stored in ROM, respectively. A mismatch indicates that a new processor card (with a new processor) has probably been inserted and that this boot record is not compatible with the new processor card (or new processor). An error is indicated and control is returned to the IBL routine, steps 470, 464 and 466. If the master boot record is compatible with the planar board and the processor card, the process checks to determine if NVRAM is reliable, step 472. If NVRAM is unreliable, an error is indicated and control is returned to the IBL routine, steps 474 and 466. Such unreliability can result, for example, from the NVRAM's losing its contents because of battery backup failure or from other hardware problems. Nevertheless, the IBL routine preferably allows the IBL procedure to occur. If NVRAM is reliable, the system configuration is checked, step 476. A change in system configuration is indicated if the model and submodel values stored in NVRAM do not match the model and submodel values stored in ROM. Note that this last comparison will only indicate a configuration error. If a configuration error is indicated, an error is generated for the user. This error notifies the user that the configuration of the system has changed since the last time SET Configuration was run. The user is notified of the changed configuration and control passed back to the IBL routine steps 478, 464, and 466. This error is not fatal itself, but notifies the user that SET Configuration (configuration program) must be executed. Referring back to step 476, if the system model/submodel values match, an indication of compatibility is set and the routine returns, steps 476, 474 and 466. Thus, the compatibility between the master boot record and the system is tested together with determining if the system configuration has been modified.

Figure 11:
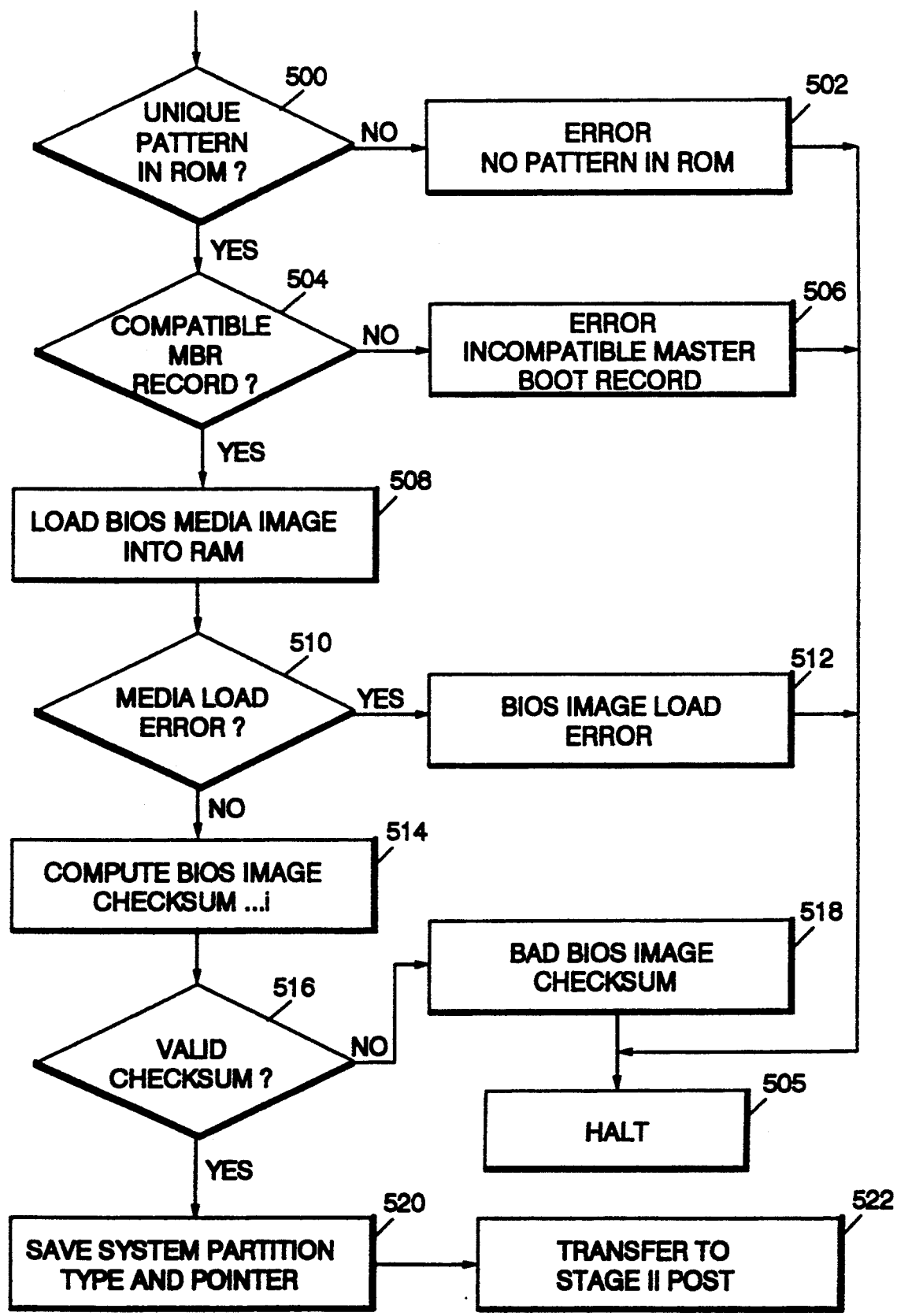
FIG. 11 is a detailed flowchart showing the operation of the executable code segment of the master boot record.

After the IBL routine loads the master boot record into RAM, it transfers control to the MBR code starting address. Referring to FIG. 11, the executable code segment of the master boot record first verifies the boot record pattern to the ROM pattern, step 500. If the pattern in the master boot record does not match the pattern in ROM, an error is generated and the system halts, steps 502 and 505. The check for equality between ROM and boot record patterns ensures that the master boot record loaded from either the disk or diskette is compatible with the ROM on the processor card which is mounted on the planar board. Referring back to step 500, if the pattern in ROM matches the pattern in the boot record, the MBR code compares the system planar ID value, model and submodel value against the corresponding master boot record values, step 504. This process was discussed in greater detail with respect to FIG. 10. If the values don't match, the master boot record is not compatible with the system planar and processor, or the system configuration has changed, and an error is generated, step 506. The system then halts, step 505.

Referring back to step 504, if the system planar ID value, model and submodel values match the corresponding master boot record values, the MBR code loads the BIOS image from the selected media into the system RAM, step 508. If a media load error occurs in reading the data, step 510, an error is generated and the system halts, steps 512 and 505. Referring back to step 510, if no media load error occurs, a checksum is calculated for the BIOS image in memory, step 514. If the checksum is invalid, an error is generated and the system halts, steps 518 and 505. Referring back to step 516, if the checksum is valid (step 516), the system partition pointers are saved, step 520, and the system processor is vectored to POST Stage II to complete system initialization and begin loading the system, step 522.

Thus, there has been shown a method and apparatus for loading BIOS from a direct access storage device. Before BIOS is loaded, the BIOS image on the direct access storage device is checked for compatibility with the system. A further test includes checking that the system configuration is proper. Based upon these tests, the compatible BIOS image is loaded into RAM to be executed.

While the invention has been illustrated in connection with a preferred embodiment, it should be understood that many variations will occur to those of ordinary skill in the art, and that the scope of the invention is defined only by the claims appended hereto and equivalent. The system may be of two types, a table model or a floor computer standing model which allows a variety of different personal computer models to be made differing in one aspect by the number of expansion and memory slots. Second, processor cards using different microprocessors can have different components mounted thereon to provide different performance characteristics and a user could readily replace or upgrade the system. Third, the system can be improved by replacing the memory units with ones of greater speed or storage capacity, and this can be readily done at the same time a processor card is replaced. Fourth, a processor card need not have all the components shown in the illustrated embodiment. The coprocessor, cache and its controller, are optional, although their absence will cause the system to perform at a different level. ECC circuitry can be used in place of the parity checking. Fifth, because the upgradeable components (i.e., the processor card and memory cards) are easily replaceable, the remaining components provide a stable design that should be usable for several years.

What is claimed is:

1. A personal computer system, comprising:
   a planar board including a main memory;
   a processor card removably mounted on said planar board,
   said processor card including a system processor electrically coupled to a read only memory, said read only memory having data representing a hardware configuration of the personal computer system, said system processor of said processor card being electrically coupled to said main memory of said planar board;
   a direct access storage device electrically coupled to said system processor;
   a master boot record included in said direct access storage device, said master boot record having a data segment and an executable code segment, said data segment representing a hardware configuration of the personal computer system which is compatible with said master boot record;
   a first portion of BIOS being included in the read only memory, said processing executing said first portion of BIOS to initialize the system and the direct access storage device to load in said master boot record, said first portion of BIOS further comparing the hardware configuration data from the master boot record to the hardware configuration data of the read only memory to verify the compatibility of the master boot record with the system processor;
   a remaining portion of BIOS being included in the direct access storage device, wherein, after verifying the compatibility of the master boot record with the system processor, said processor transferring control from the first portion of BIOS to the executable code segment of the master boot records in order to effect the loading of the remaining portion of BIOS into the main memory, said first portion of BIOS being discarded after transferring control to the executable code segment; and,
   if said master boot record is incompatible with said system processor, said processor executing said first portion of BIOS to load in a second master boot record to replace said master boot record and verifying compatibility of said second master boot record with said system processor.

2. A system as claimed in claim 1, wherein the data segment of the master boot record includes a value representing a system planar being compatible with the master boot records and further wherein the system planar further includes a means for uniquely identifying the system planar in order to verify the compatibility of the master boot record to the system planar.

3. A system as claimed in claim 1, wherein the direct access storage device comprises a fixed disk drive.

4. A system as claimed in claim 1, wherein the direct access storage device comprises a diskette drive.

5. A system as claimed in claim 1, wherein the hardware configuration data on the master boot record includes a model value and a submodel value, wherein the model value identifies the system processor and the submodel value represent the I/O configuration of the system planar, said model value and submodel value being compared to corresponding values in the read only memory to verify the compatibility of the master boot record to the hardware configuration.

6. A system as claimed in claim 1, wherein the personal computer system further includes a nonvolatile random access memory, said nonvolatile random access memory storing values representing the system configuration, said values being updated when the configuration of the system is changed, wherein said first portion of BIOS compares said values in the nonvolatile random access memory to corresponding values in the read only memory to determine if the configuration of the system has changed.

7. A personal computer system, comprising:
   a frame;
   a planar board mounted on said frame;
   a processor card removably mounted on said planar board;
   said planar board comprising a first printed circuit board (PCB) having a plurality of first components mounted thereon and first circuit means electrically interconnecting said first components;
   said first components comprising a main memory for storing programs and data, I/O connector means adapted to be connected to I/O devices, and I/O controllers for controlling transference or information to and from said I/O devices;
   said first circuit means comprising an I/O bus and a memory bus;
   said first component means further comprising electrical edge connector means connected to said I/O bus, said memory bus, and said processor card, said edge connector means comprising a multiplicity of springlike contact arms arranged in two opposing rows, said contact arms in each row slanting towards the arms in the other row, said contact arms in each row being longitudinally evenly spaced along each of said respective rows;

said processor card comprising a second PCB having a plurality of second components mounted thereon and second circuit means interconnecting said second components;

said second components comprising a microprocessor, a memory controller, a read-only memory, error checking means, and a direct memory access controller;

said second PCB having a long straight edge extending into said openings of said first and second electrical connectors, said second PCB further comprising a multiplicity of surface contacts located along and adjacent to said edge on opposite sides of said second PCB, said contacts being evenly spaced along said edge in correspondence with the spacing of said contact arms and being electrically connected to said contact arms, said contacts being connected to and forming part of said second circuit means whereby said first and second circuit means are interconnected through said contacts and said contact arms, said second PCB being frictionally held in place by a total frictional force developed between all of said contacts and contact arms;

first and second pivot pins mounted on said second PCB at opposite corners thereof away from said edge;

first and second fulcrums mounted on said frame adjacent to said processor card;

and elongated first and second levers pivotally mounted on said second PCB for rotation about said pivot pins on axes that extend through said levers at points intermediate to the ends thereof, each axis being closer to one end of its lever mounted than to the other end to create two moment arm, sid one ends of said first and second levers being respectively engaged with said first and second fulcrums, said one ends each having a pair of angularly joined jaws straddling said fulcrums and providing first and second surfaces, said first surfaces being engaged with said fulcrum means to prevent movement of said processor card in one direction except upon rotation of said levers, said second surfaces being engageable with said fulcrums upon rotation of said levers to extract said processor card from said edge connector means;

a direct access storage device being electrically coupled to the microprocessor, said direct access storage device being capable of storing a plurality of data records;

a master boot record included in the direct access storage device, said master boot record including an executable code segment;

a first portion of BIOS being included in the read only memory, said processor executing said first portion of BIOS to initialize the system and the direct access storage device to load in said master boot record into main memory; and a remaining portion of BIOS being included in the direct access storage device, wherein said processor transfers control from the first portion of BIOS to the executable code segment of the master boot record in order to effect the loading of the remaining portion of BIOS into the main memory, said first portion of BIOS being discarded after transferring control of the executable code segment; and, if said master boot record is incompatible with said system processor, said processor executing said first portion of BIOS to load in a second master boot record to replace said master boot record and verifying compatibility of said second master boot record with said system processor.

8. A system as claim in claim 7 wherein:

second circuit means comprises an internal bus connected to said microprocessor, an I/O bus connected to said internal bus and to certain ones of said contacts and a memory bus connected to said internal bus and certain other ones of said contacts, said I/O bus of said first PCB being connected to contact arms engaged with said certain ones of said contacts, and said memory bus of said first PCB being connected to contact arms engaged with said certain other ones of said contacts, to form an I/O bus and a memory bus which extends through said planar board and said processor card.

9. A system as claimed in claim 8, wherein said second components further comprise:

cache means mounted on said second PCB and being connected to said internal bus, and a coprocessor mounted on said second PCB and being connected to said internal bus for performing certain operations at high speed.

10. A system as claimed in claim 8, wherein said second components further comprise:

a bus control unit mounted on said second PCB and being connected to said channel bus for controlling operation thereof.

11. A system as claimed in claim 7, further comprising:

latching means on said first and second levers engageable with said second PCB for latching said levers into predetermined positions relative to said second PCB.

12. A system as claimed in claim 11, wherein:

said latching means comprises a pair of flexible arms on each lever straddling an adjacent portion of said second PCB and being engaged therewith.

13. A personal computer system unit comprising:

a frame;

a planar board mounted on said frame, said planar board comprising a first printed circuit board (PCB) and a plurality of first components mounted on said first PCB including first electrical connector means;

said first electrical connector means comprising first and second edge connectors each comprising an elongated insulating housing having a multiplicity of springlike contact arms mounted therein in two opposing rows separated by a gap having a predetermined width, said contact arms being slanted one row towards the other row;

a processor card comprising a second PCB, and plurality of second components mounted on said second PCB including a microprocessor, a read only memory, memory controller, a direct access memory controller and error checking means, said second PCB having second circuit means interconnecting said second components;

said second PCB having a long straight edge and a multiplicity of surface contacts located along and adjacent to said edge of opposite sides of said second PCB, said edge being beveled to form a wedge, said second PCB having a thickness greater than said predetermined width of said gap, each of said contacts being electrically connected to said second circuit means fulcrum means mounted on said frame adjacent to said processor card;

and first and second levers pivotally mounted on said processor card for rotation between first and second positions relative to said processor cad, said rotation being about axes that extend perpendicular to said second PCB and through said levers at points intermediate to the ends thereof, each lever having handle at one end and a pair of angularly joined jaws at its other end, said jaws providing first and second camming surfaces, said levers being operative upon engagement of said first surfaces with said fulcrums and concurrent rotation of both levers from said first positions to said second positions to force said wedge into said gap to thereupon move said contact arms against said bias thereof and slide along said edge into engagement with said contacts, said first surfaces abutting said fulcrums when said levers are in said second positions to prevent movement of said processor card except upon rotation of said levers out of said second position, said second surfaces of said jaws being operative upon rotation of said levers from said second positions to cam against said fulcrums and move said processor card out of engagement with said first and second edge connectors;

a direct access storage device being electrically coupled to the microprocessor, said direct access storage device being capable of storing a plurality of data records;

a master boot record included in the direct access storage device, said master boot record including an executable code segment;

a first portion of BIOS being included in the read only memory, said processor executing said first portion of BIOS to initialize the system and the direct access storage device to load in said master boot record into main memory; and a remaining portion of BIOS being included in the direct access storage device, wherein said processor transfers control from the first portion of BIOS to the executable core segment of the master boot record in order to effect the loading of the remaining portion of BIOS into the main memory, said first portion of BIOS being discarded after transferring control to the executable code segment; and, if said master boot record is incompatible with said system processor, said processor executing said first portion of BIOS to load in a second master boot record to replace said master boot record and verifying compatibility of said second master boot record with said system processor.

14. A system as claimed in claim 13, further comprising:

a locating key extending laterally across said gap in said first edge connector, said edge of said second PCB having a notch therein the walls of which are slidingly engageable with said key to align said contacts with said contact arms and prevent any longitudinal movement between said second PCB and said edge connectors.

15. A system as claimed in claim 14 comprising:

a second key extending across the gap in said second edge connector, said first and second connectors being longitudinally spaced apart to locate said connectors relative to one another by a predetermined distance between said first and second keys, said edge of said second PCB having a second notch therein of a size large than said second key to freely allow said edge to fit over said second key.

16. A system as claimed in claim 13 comprising:

a first guide attached to said frame adjacent to said first fulcrum and being engaged with said first lever to prevent lateral movement of said second PCB.

17. A system as claimed in claim 16 wherein:

said first guide comprises a flat element, and said first lever has a split jaw straddling both sides of said flat element.

18. A system as claimed in claim 16 comprising:

a second guide located adjacent said second fulcrum and being engaged with said second lever to prevent lateral movement of said second PCB at a second portion thereof.

19. A system as claimed in claim 17 herein:

said first guide and said first fulcrum are made in a single unit with said fulcrum extending transversely, and said first guide lying generally in alignment with said second PCB and immediately adjacent to said first fulcrum.

20. A personal computer system, comprising:

a frame;

a planar board mounted on said frame;

a process card removably mounted on said planar board;

said planar board comprising a first printer circuit board (PCB) having a plurality of first components mounted thereon and first circuit means electrically interconnecting said first components;

said first components comprising a main memory for storing programs and data, I/O connector means adapted to be connected to I/O devices, and I/O controllers for controlling transference of information to and from said I/O devices;

said first circuit means comprising an I/O bus and a memory bus;

said first component means further comprising electrical edge connector means connected to said I/O bus, said memory bus, and said processor card, said edge connector means comprising a multiplicity of springlike contact arms arranged in two opposing rows, said contact arms in each row being slanted towards the arms in the other row, said contact arms in each row being longitudinally evenly spaced along each of said respective rows;

said processor card comprising a second PCB having a plurality of second components mounted thereon and second circuit means interconnecting said second components;

said second components comprising a microprocessor, a memory controller, a read-only memory, error checking means, and a direct memory access controller;

said second PCB having a long straight edge extending into said openings of said first and second electrical connectors, said second PCB further comprising a multiplicity of surface contacts located along and adjacent to said edge on opposite sides of said second PCB, said contacts being evenly spaced along said edge in correspondence with the spacing of said contact arms and being electrically connected to said contact arms, said contacts being connected to and forming part of said second circuit means whereby said first and second circuit means are interconnected through said contacts and said contact arms, said second PCB being frictionally held in place by a total frictional force developed between all of said contacts and contact arms;

a direct access storage device being electrically coupled to the microprocessor, said direct access storage device being capable of storing a plurality of data records;

a master boot record included in the direct access storage device, said master boot record including an executable code segment;

a first portion of BIOS being included in the read only memory, said processing executing said first portion of BIOS to initialize the system and the direct access storage device to load in said master boot record into main memory; and a remaining portion of BIOS being included in the direct access storage device, wherein said processor transfers control from the first portion of BIOS to the executable code segment of the master boot record in order to effect the loading of the remaining portion of BIOS into the main memory, said first portion of BIOS being discarded after transferring control to the executable code segment; and, if said master boot record is incompatible with said system processor, said processor executing said first portion of BIOS to load in a second master boot record to replace said master boot record and verifying compatibility of said second master boot record with said system processor.

* * * * *